(12) United States Patent
Nelson et al.

(10) Patent No.: US 9,845,978 B2
(45) Date of Patent: *Dec. 19, 2017

(54) RESIDENTIAL HEAT PUMP WATER HEATER

(75) Inventors: Jonathan D. Nelson, Louisville, KY (US); Craig Lung-Pei Tsai, Louisville, KY (US); Jeffrey Alan Kern, Louisville, KY (US); Eliel Fresco Rodriguez, Louisville, KY (US); Michael T. Beyerle, Powee Valley, KY (US); Derek Lee Watkins, Elizabethtown, KY (US); Timothy Allen Hamel, Louisville, KY (US); Marlin Zenther, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 1381 days.

This patent is subject to a terminal disclaimer.

(21) Appl. No.: 13/323,190

(22) Filed: Dec. 12, 2011

(65) Prior Publication Data

US 2012/0145095 A1 Jun. 14, 2012

Related U.S. Application Data

(63) Continuation of application No. 12/371,572, filed on Feb. 13, 2009, now Pat. No. 8,422,870.

(51) Int. Cl.
*H05B 3/78* (2006.01)
*F25B 30/02* (2006.01)
(Continued)

(52) U.S. Cl.
CPC .......... *F25B 30/02* (2013.01); *F24D 17/0031* (2013.01); *F24D 17/02* (2013.01);
(Continued)

(58) Field of Classification Search
None
See application file for complete search history.

(56) References Cited

U.S. PATENT DOCUMENTS

| 3,017,162 A | 1/1962 | Haines et al. |
| 4,363,221 A | 12/1982 | Singh |

(Continued)

FOREIGN PATENT DOCUMENTS

| AT | 383432 B | 7/1987 |
| AU | 719740 B2 | 5/2000 |

(Continued)

OTHER PUBLICATIONS

U.S. official action dated Nov. 9, 2011 for U.S. Appl. No. 12/371,571, 13 pages.

(Continued)

*Primary Examiner* — Thor Campbell
(74) *Attorney, Agent, or Firm* — Dority & Manning, P.A.

(57) ABSTRACT

A heat pump water heater and systems and methods for its control. The systems are configured to heat water within a water storage tank of a heat pump water heater wherein a controller within the system is operatively connected to a plurality of heat sources including at least one electric heating element and a heat pump and sensors in order to selectively energize one of the plurality of heat sources. The controller is configure to process data representative of the temperature of water within the tank near the top of the water storage tank, and rate of water flowing out of the water storage tank, in order to automatically selectively energize the heat sources. The selection of heat sources by the controller is determined by a mode of operation selected by the user and the data processed by the controller in view of the selected mode of operation.

11 Claims, 14 Drawing Sheets

(51) Int. Cl.
  *F24H 4/04*   (2006.01)
  *F24H 9/20*   (2006.01)
  *F24D 17/00*  (2006.01)
  *F24D 17/02*  (2006.01)
  *F24D 19/10*  (2006.01)

(52) U.S. Cl.
  CPC ........... *F24D 19/1054* (2013.01); *F24H 4/04* (2013.01); *F24H 9/2007* (2013.01); *F24D 2200/08* (2013.01); *F24D 2200/12* (2013.01); *F25B 2339/047* (2013.01); *F25B 2400/01* (2013.01); *F25B 2700/21161* (2013.01)

(56) References Cited

U.S. PATENT DOCUMENTS

| | | |
|---|---|---|
| 4,381,549 A | 4/1983 | Stamp, Jr. et al. |
| 4,638,147 A | 1/1987 | Dytch et al. |
| 4,645,908 A | 2/1987 | Jones |
| 5,052,186 A | 10/1991 | Dudley et al. |
| 5,220,807 A | 6/1993 | Bourne et al. |
| 5,255,338 A | 10/1993 | Robinson et al. |
| 5,877,476 A | 3/1999 | Yabuki et al. |
| 5,906,109 A | 5/1999 | Dieckmann et al. |
| 5,946,927 A | 9/1999 | Dieckmann et al. |
| 6,210,488 B1 | 4/2001 | Bruce |
| 6,212,894 B1 | 4/2001 | Brown et al. |
| 6,238,743 B1 | 5/2001 | Brooks |
| 6,837,443 B2 | 1/2005 | Saitoh et al. |
| 6,874,694 B2 | 4/2005 | Saitoh et al. |
| 7,176,352 B1 | 2/2007 | Edelman et al. |
| D605,263 S | 12/2009 | Nelson et al. |
| 8,111,980 B2 | 2/2012 | Bradenbaugh |
| 8,422,870 B2 | 4/2013 | Nelson et al. |
| 2002/0125241 A1 | 9/2002 | Scott et al. |
| 2007/0078528 A1 | 4/2007 | Anke et al. |
| 2007/0157634 A1 | 7/2007 | Hartge |
| 2010/0116817 A1 | 5/2010 | Miller et al. |
| 2010/0209084 A1 | 8/2010 | Nelson et al. |

FOREIGN PATENT DOCUMENTS

| | | |
|---|---|---|
| CN | 1740650 A | 3/2006 |
| CN | 1740705 A | 3/2006 |
| CN | 200965352 Y | 10/2007 |
| CN | 201081406 Y | 7/2008 |
| DE | 10345300 A1 | 5/2005 |
| EP | 0130694 A2 | 1/1985 |
| EP | 1167896 B1 | 3/2004 |
| EP | 1777471 A1 | 4/2007 |
| FR | 2492071 A1 | 4/1982 |
| JP | 61213436 A | 9/1986 |
| JP | 2001288552 A | 10/2001 |
| JP | 2007071504 A | 3/2007 |
| WO | 99/53248 A1 | 10/1999 |
| WO | 2006/096075 A1 | 9/2006 |

OTHER PUBLICATIONS

International Search Report issued in connection with PCT/US2010/021819, dated Nov. 10, 2011.
Invitation to Pay Additional Fees issued in connection with PCT/US2010/022097, dated Nov. 30, 2011.
Office Action issued in connection with related EP Application No. 10701302.1 dated Apr. 19, 2013.
English translation of Office Action issued in connection with related CN Application No. 201080008052.3 dated Dec. 27, 2013.
English translation of Office Action issued in connection with corresponding CN Application No. 201080007878.8 dated Feb. 19, 2014.

RESIDENTIAL HEAT PUMP WATER HEATER

CROSS-REFERENCE TO RELATED APPLICATIONS

This application is a continuation of prior-filed, U.S., non-provisional patent application Ser. No. 12/371,572, filed on Feb. 13, 2009 now U.S. Pat. No. 8,422,870.

FIELD OF INVENTION

Embodiments of the present invention relate to water heaters. More specifically, embodiments of the present invention relate to, heat pump water heaters.

BACKGROUND OF THE INVENTION

A widely accepted and used water heater for residential hot water production and storage is the electric resistance water heater and storage tank. Water heaters typically include a tank defining a chamber for retention of water. A water inlet pipe that is provided with a first connection for interconnection with a cold water supply line that conveys fresh relatively cold water into the chamber. Within the tank there are electric resistance elements that heat the water in the tank. In current embodiments, there are at least two electric resistance elements. A first electric resistance element positioned near the bottom of the tank and a second electric resistance element positioned near the top of the tank. There are also two sensors positioned on the exterior of the tank that measure the temperature of the tank near the top and bottom of the tank in proximity to the location of the electric resistance elements. When the temperature sensed by such sensors drops below a certain temperature level, these sensors close the contacts associated with the corresponding electric resistance elements causing the electric resistance elements to energize.

When water is supplied to the tank, it is supplied through a dip tube that pushes the cold water to the bottom of the tank and thereby pushes the hot water out of the top through the outlet pipe where water is the hottest. One of the problems with this configuration is that the sensor near the top of the tank can't detect that hot water is exiting and cold water is entering the tank near the bottom. The lower sensor detects that cold water is entering the tank when it detects a temperature drop at the thermostat, which is the primary purpose for having two sensors. When the lower sensor detects a temperature drop below a certain level, it closes the contact and energizes the lower electric resistance element until the temperature reaches a specified level. But, each time the lower electric resistance element heats the water; the heated water is buoyant and goes up to the top of the tank. For example, if the tank is holds 50 gallons of water, and three gallons of water flow into the tank, it may cause the lower electric resistance element to be energized for a few minutes in order to recover the temperature. If a few minutes later, there is a draw of another three gallons of water, the lower electric resistance element is energized again for another few minutes in order to recover the temperature. This causes the heated water to rise to the top creating a problem called stacking. Under sequential small draws of water, the lower electric resistance element is energized each time and runs until the lower sensor is satisfied that the lower part of the tank is sufficiently warm. When this is occurring, the top part of the tank continues to get a little bit hotter each time which causes over heating of water in the top of the tank, which can potentially lead to undesirably hot water being drawn from the tank. So there is a need for a configuration that solves the problem associated with stacking resulting from small sequential water draws made on current water heaters.

BRIEF DESCRIPTION OF THE INVENTION

Consistent with embodiments of the present invention, systems for controlling a heat pump water heater (HPWH) are disclosed. The systems are configured to heat water within a water storage tank of a heat pump water heater wherein a controller within the system is operatively connected to a heat pump and a pair of electric resistance heaters. The heat pump condenser is positioned proximate the water storage tank to facilitate the transfer heat from the condenser to the water in the water storage tank. A first electric resistance heater is positioned within the water storage tank in proximity to the bottom of the water storage tank. A second electric resistance heater is positioned within the water storage tank in proximity to the top of the water storage tank. The system further includes a temperature sensor positioned to determine the temperature of water within and in proximity to the top of the water storage tank. The controller includes a module configured to process data representative of temperature readings of water within the water storage tank. Upon processing temperature readings, the controller automatically selects and controls energizing of a heat pump condenser and the pair of electric heating elements. Data representative of the rate at which water flows into and from the water storage tank, the temperature of refrigerant, typically in a gas or vapor state entering a condenser and the temperature of refrigerant, typically at least partially in liquid state exiting the condenser is also processed by the controller. The controller automatically energizes one or more of the heat pump, the first electric resistance heater, and the second electric resistance heater in response to data processed.

Still consistent with embodiments of the present invention, methods of heating water within a water storage tank of a heat pump water heater including a controller operatively connected to heating elements and sensors selects and utilizes the appropriate heating elements to heat the water within the water storage tank without overheating of the water are disclosed. The methods may include positioning condensers of a heat pump in proximate the water storage tank for a heat exchange relationship with the water contained in the tank to transfer heat to the water in the tank, positioning electric heating elements to heat water within the water storage tank, periodically processing the temperature readings measured by a plurality of sensors in order to automatically control the selection and energizing one or more of the heat pump and the electric heating elements.

Still consistent with embodiments of the present invention, a method and apparatus for heating water within a water storage tank of a heat pump water heater including a condenser configuration in which the inlet portion of the condenser is positioned proximate the bottom of the tank to deliver heat first to the water in the lowermost region of the tank are disclosed.

Still consistent with embodiments of the present invention, a method and apparatus for heating water within a water storage tank of a water heater including a controller operatively connected to heating elements, which avoids the aforementioned stacking problem while using a single sensor for monitoring the temperature of the water in the tank and an event flow module configured to receive and process data representative of temperature readings measured by the temperature sensor in order to determine if water is flowing through the water storage tank are disclosed.

BRIEF DESCRIPTION OF THE FIGURES

Non-limiting and non-exhaustive embodiments are described with reference to the following figures, wherein like reference numerals refer to like parts throughout the various views unless otherwise specified.

GENERAL DESCRIPTION

Figure 1:
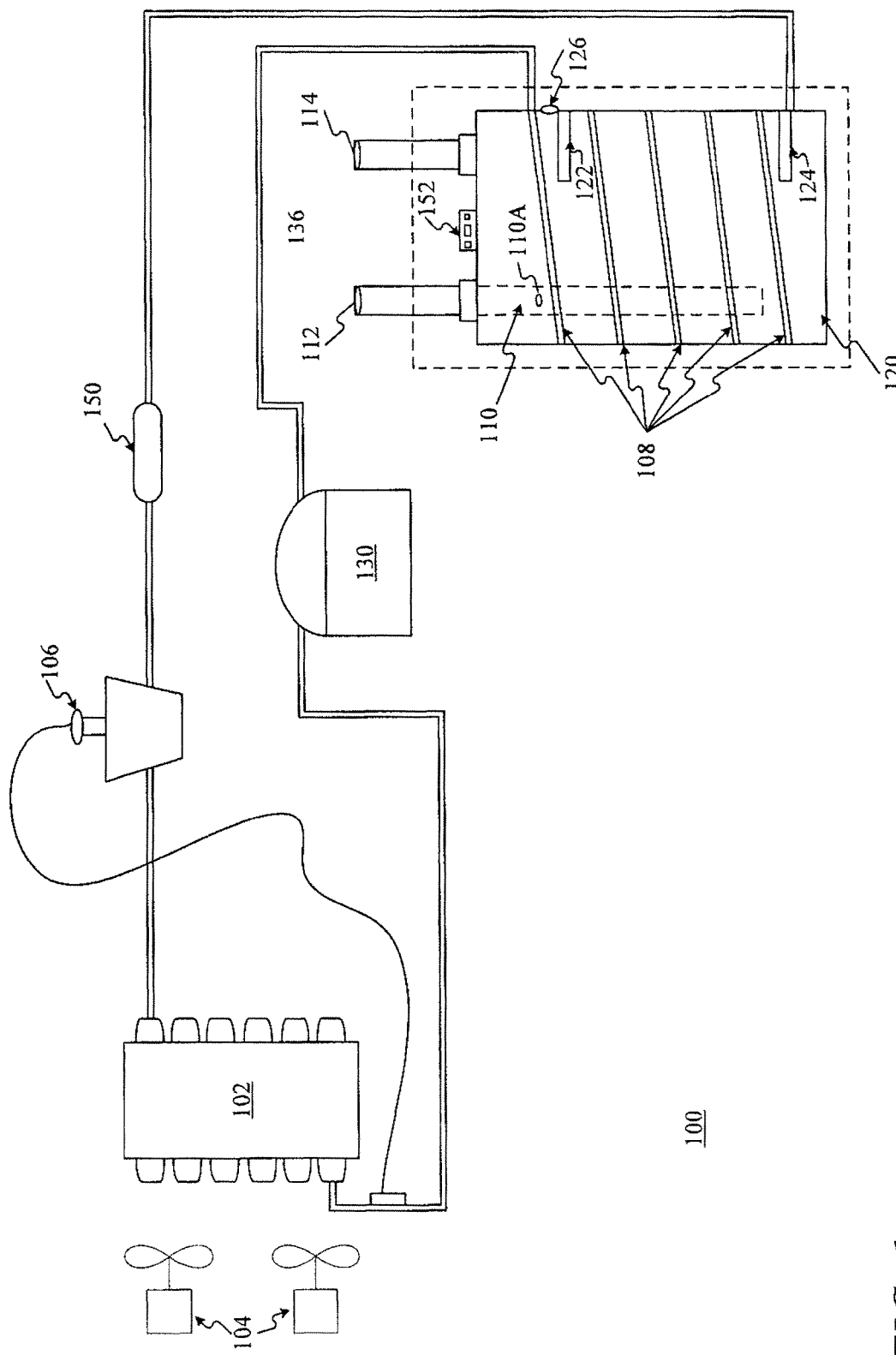
FIG. 1 depicts a first embodiment of a heat pump water heater schematic consistent with embodiments of the invention.

Reference may be made throughout this specification to "one embodiment," "an embodiment," "embodiments," "an aspect," or "aspects" meaning that a particular described feature, structure, or characteristic may be included in at least one embodiment of the present invention. Thus, usage of such phrases may refer to more than just one embodiment or aspect. In addition, the described features, structures, or characteristics may be combined in any suitable manner in one or more embodiments or aspects. Moreover, reference to a single item may mean a single item or a plurality of items, just as reference to a plurality of items may mean a single item.

Embodiments of the present invention utilize a controller programmed to control a heat pump water heater, though not all aspects of the invention are limited to heat pump water heaters, but may have other applications as well, such as for example, electric water heaters. The controller may be programmed to have preset modes of operation. In addition, the controller may be programmed to interpret various temperature and data inputs for use in controlling the heat sources of the water heater. Furthermore, the temperature and data inputs may be interpreted by the controller to automatically select and energize one or more of the electric heating elements and heat pump (via energization of the compressor) in an effort to efficiently heat the water in a manner that prevents over heating of the water caused by stacking.

DETAILED DESCRIPTION

Various embodiments are described more fully below with reference to the accompanying drawings, which form a part hereof, and which show specific embodiments of the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Accordingly, the following detailed description is, therefore, not to be taken in a limiting sense.

The embodiments described set forth embodiments of a heat pump water heater system that utilizes one or more electric resistance elements, as well as a heat pump or refrigeration sealed system to impart heat to the water. The energy required to heat water is significantly reduced by utilizing a refrigeration sealed system to move the heat from the air of the surrounding warm environment into the water. In the embodiments described in FIGS. 1-5, each heat pump water heater system discloses various sensors, one of which is positioned to sense water temperature within the water storage tank. The data from this sensor is used not only to sense the temperature of the water in the tank but also, in embodiments lacking a flow meter, to indirectly detect the occurrence of a flow event, that is, the flow of hot water and the associated flow of cold water out of and into the water storage tank respectively. In some embodiments a flow meter is used to directly detect the occurrence of a flow event. The sensor positioned to sense water temperature within the water storage tank may be positioned within the water storage tank or alternatively on the exterior of the tank in contact with the tank sidewall.

The data representative of water temperature within the water storage tank, and the occurrence of a flow event is transmitted to a controller for processing. The controller is operatively connected to electric resistance heaters and the heat pump and includes a module that facilitates the automatic selection and energizing of at least one of the heat pump and the electric resistance heaters in response to data received that is representative of water temperature within the water storage tank and the occurrence of a water flow event.

Referring now to the figures, FIG. 1 depicts a heat pump water heater 100 schematic consistent with a first embodiment of the invention. The heat pump system comprises an evaporator 102, a compressor 130, a condenser 108, a throttling device 106, and at least one fan 104. Condenser 108 is assembled in a heat exchange relationship with the water in the water storage tank 120. During operation of the heat pump cycle a refrigerant exits the evaporator 102 as a fluid in the form of a superheated vapor and/or high quality vapor mixture. Upon exiting the evaporator 102 the refrigerant enters the compressor 130 where the pressure and temperature increase. The temperature and pressure are increased in the compressor 130 such that the refrigerant becomes a superheated vapor. The superheated vapor from the compressor 130 enters the condenser 108. While in the condenser 108, the superheated vapor transfers energy to the water within a storage tank 120. Upon transferring energy to the water within the storage tank 120, the refrigerant turns into a saturated liquid and/or high quality liquid vapor mixture. This high quality/saturated liquid vapor mixture exits the condenser 108 and travels through the throttling device 106. Upon exiting the throttling device 106 the pressure and temperature of the refrigerant drop at which time the refrigerant enters evaporator 102 and the cycle repeats itself.

The heat pump water heater 100 includes a water inlet line 112 for allowing cold water to enter the heat pump water heater 100, where it is directed to the bottom of the tank 120 via a dip tube 110. The heat pump water heater 100 also has electric heating elements 122 and 124 placed near the top and bottom of the water storage tank 120 to heat the water. In the embodiments herein described the heating elements are shown projecting into the interior of the tank, however, other configurations providing for positioning the upper and lower elements to heat the water in the upper and lower regions of the tank respectively could be similarly employed. The heated water exits the heat pump water heater near top of tank 120 at exit 114 and flows to the residence or other place where heated water is desired. The heat pump water heater 100 has a temperature sensor 126 positioned to sense the temperature of the water in the upper region of the tank and may also have additional temperature sensors placed at various locations for sensing other temperatures, such as heat pump condenser inlet and outlet temperatures, ambient temperature, etc.

In the first embodiment illustrated in FIG. 1, a single water temperature sensor 126 is positioned toward the upper end of the tank 120. The heat pump condenser 108 is positioned in a heat exchange arrangement with the water storage tank 120 to enable heat from the condenser to heat the water in the storage tank. The system includes a controller 152, equipped with a microprocessor programmed to include a water temperature and flow module, which is operatively connected to the heat pump water heater and configured to receive data representative of temperature readings measured by the single sensor 126. The temperature readings received by the controller 152 are processed by the water temperature and flow module to determine the temperature of the water in the tank 120. The water temperature and flow module within the controller 152 is further configured to process data representative of temperature readings measured by the single sensor 126 to determine the rate at which the temperature of water in the water storage tank 120 changes. In response to the sensed water temperature and the rate at which the temperature of water in the water storage tank 120 changes, the controller 152 determines which of the compressor 130, an upper electric resistance heater 122, and a lower electric resistance heater 124 shall be energized, and for how long, in order to heat the water within the water storage tank 120. The controller 152 and the water temperature and flow module stored therein, along with the single sensor 126, are operatively configured to effectively respond to small amounts of water being withdrawn from the water storage tank which causes small temperature changes, thereby eliminating the need for a second sensor to be positioned in the lower portion of the water storage tank 120. This rate of temperature change information could also be used in lieu of a flow meter to detect the approximate flow rate of water being withdrawn from the tank, for example, by comparing the detected rate of change of temperature with a look up table comprising a set of empirically determined temperature change rate/flow rate correlations and choosing the flow rate associated from the table that is closest to the detected temperature rate of change.

The system may also be programmed to determine how much water is used in a short period of time in order to use that information to determine the most efficient manner to heat the unheated water added to the water storage tank 120.

Figure 2:
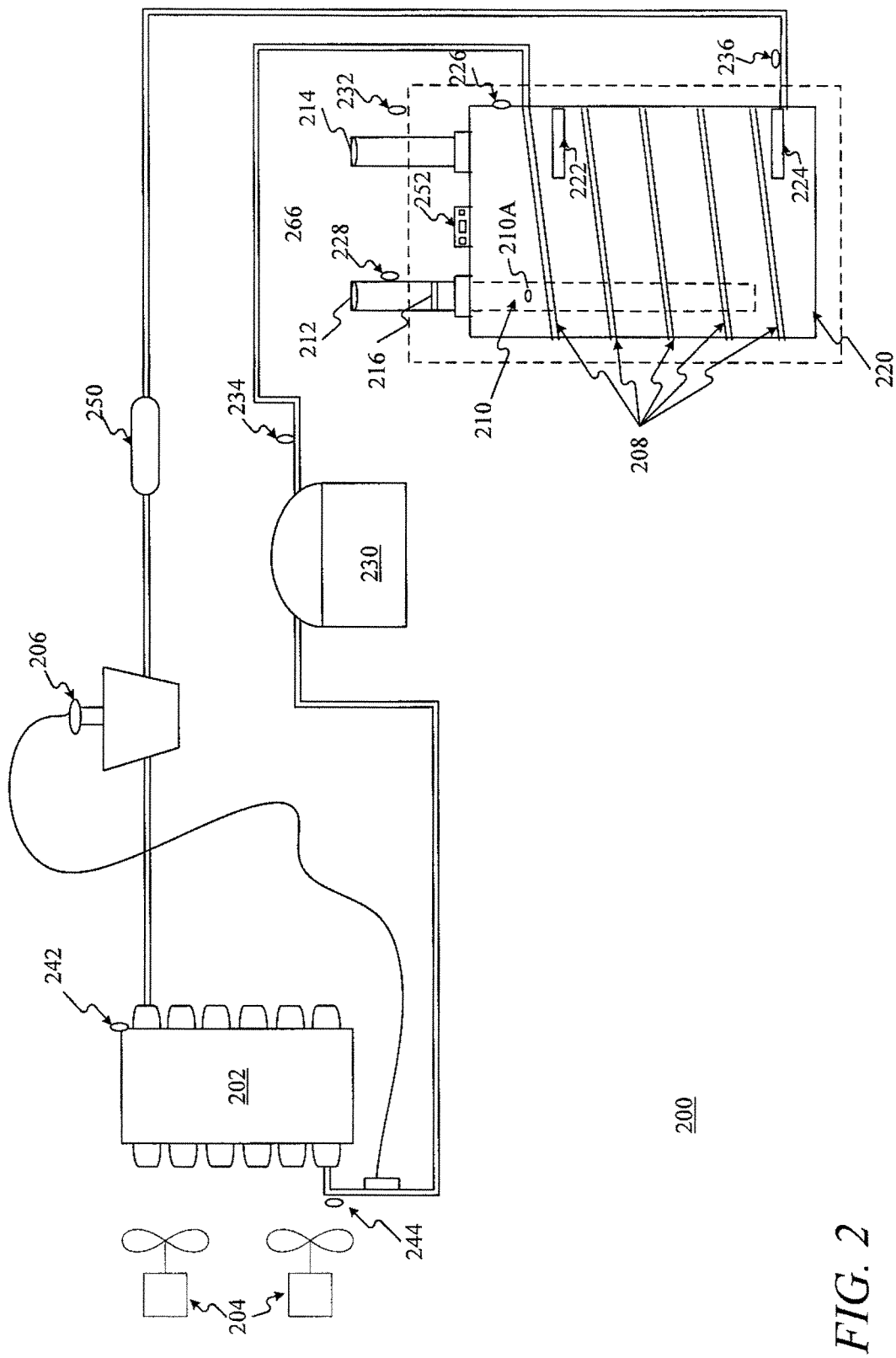
FIG. 2 depicts a second embodiment of a heat pump water heater schematic consistent with embodiments of the invention.

As illustrated in FIG. 2, the second embodiment includes a flow meter 216 positioned in the water inlet line 212. Flow meter 216 transmits data representative of the amount of water flowing into the water storage tank 220 to the water temperature and flow module within the controller 252. Under circumstances in which large amounts of water are removed from the water storage tank 220 in short periods of time, single sensor 226 may not read changes in water temperature at a speed that facilitates immediate recognition by the controller 252 that large amounts of water have been removed from the water storage tank 220. When large amounts of water are removed from water storage tank 220, the energizing of alternate and/or additional heating elements may be necessary in order to heat the water in the most efficient and timely manner. The controller 252 processes data representative of the rate of flow of water into the water storage tank 220 received from the flow meter 216 along with the data received from single sensor 226 in order to determine which of the compressor 230, the upper electric resistance heater 222, and the lower electric resistance heater 224 shall be energized in order to heat the water within the water storage tank 220.

The embodiment illustrated in FIG. 2, also includes a second temperature sensor 228 in the water inlet line 212 in order to sense the temperature of the water flowing into water storage tank 220 through the water inlet line 212. The controller 252 processes data representative of the temperature of water flowing into water storage tank 220 through the water inlet line 212 in order to determine a projected temperature of the water within the water storage tank 220 when the water flowing into the water storage tank and the heated water already within the water storage tank are combined. The ability to project a resultant temperature from the combination of unheated water flowing into the water storage tank 220 and the heated water already within the water storage tank 220 allows the controller 252 to preemptively and automatically determine which of the compressor 230, the upper electric resistance heater 222, and the lower electric resistance heater 224 needs to be energized in order to heat the water within the water storage tank 220. As illustrated, the heat pump water heater also includes an external temperature sensor 232 which is configured to transmit data representative of the temperature of the air surrounding the water storage tank 220 to the controller 252 for processing. The controller 252 processes data representative of the temperature of the air surrounding the water storage tank 220 in order to determine the efficiency of the heat pump system when compressor 230 is energized to heat the water within the water storage tank 220.

In the first and second embodiments illustrated in FIGS. 1 and 2 respectively, because thermistors are used to sense temperature as opposed to the bi-metal sensors which are commonly used in the industry, the system controller 152/252 can detect small changes in temperature. The water temperature and flow module within the controller 152/252 processes the temperature readings transmitted by temperature sensor 126/226 to detect the rate of change in temperatures measured by sensor 126/226 over time. For example, if water storage tank 120/220 is full of water heated to a previously defined temperature and then a user draws a small amount of water, such as three to five gallons, then temperature sensor 126/226 will detect some but not a significant change in water temperature. It is possible to distinguish between the change in temperature caused by a withdrawal of water from water storage tank 120/220 and a change in temperature resulting from the HPWH system being in standby mode and no water is being withdrawn because, the water temperature and flow module monitors the decline in water temperature measured by the temperature sensor 126/226 over time. In standby mode, the decline in temperature measured by temperature sensor 126/226 is a very slow decline. As soon as water is withdrawn, even at a low flow rate, the rate of decline measured by temperature sensor 126/226 is faster than the decline measured by sensor 126/226 when no water is being withdrawn. Accordingly, a fast decline in water temperature over time measured by sensor 126/226 is an indication to the controller 152 that a flow event has occurred. In embodiments such as FIG. 1, which does not include a flow meter to measure flow directly, flow events are determined by the controller 152 based on the speed with which the temperature of water within the water storage tank changes over time.

Upon detection of a flow event, the controller 152 may decide to energize the lower heating element or compressor and may transmit heat to the water for as long as is required to get the temperature back up to the set point temperature as detected by the sensor 126. This allows the lower heating element or compressor to be energized upon detection of a flow event and heat the water in the lower portion of the tank without causing water in the top of the water storage tank to be overheated. By controlling the lower heating element 124 or compressor with the upper sensor 126, in this manner, sequential small draws of water will not result in the water in the top of the water storage tank 120 being overheated as a result of stacking.

Referring still to the embodiment of FIG. 2, a temperature sensor is also placed at the outlet of the compressor 230 as indicated by reference numeral 234 to sense the temperature of the super heated vapor exiting the compressor, which is also essentially the temperature of the vapor entering the condenser 208. A temperature sensor 236 is also placed at the outlet of condenser 208 in order to measure the temperature of the refrigerant exiting the condenser 208. Temperature sensors 234 and 236 allow a system controller 252 to approximate energy transmitted to the water within the water storage tank by the condenser 208. Data representative of the drop in temperature across the condenser as measured by temperature sensors 234 and 236 is transmitted to the controller 252 and processed along with the previously described temperature data to automatically determine whether additional heating elements 222 or 224 need to be activated in order to heat the water within the water storage tank 220. Similarly, temperature sensors 242 and 244 are used to measure the inlet and outlet temperatures respectively of the evaporator, to monitor the evaporator "superheat". When operating properly, the temperature difference between the outlet temperature and inlet temperature should be on the order of 10° F. For efficient operation of the sealed system and to avoid potential damage to the compressor resulting from refrigerant not fully evaporating, the controller 252 is configured to turn off the sealed system if the temperature difference between the outlet temperature and the inlet temperature is less than 5° F. Also, if the temperature difference is too high, a signal may be generated to inform the user of inefficient operation.

The system controller 252 is operatively connected to the heat pump water heater 200 and configured to receive data representative of temperature readings measured by the temperature sensors 226, 236, 232, 234, 242 and 244. During operation of the heat pump water heater 200, any one of the electric heating elements 222 and 224, and compressor 230 may also operate at any given time. Generally, the compressor 230 and the electric heating elements 222 and 224 do not operate at the same time. However, it is contemplated that one of electric heating elements 222 or 224 and the compressor 230 may operate simultaneously. While it is contemplated that both electric heating elements 222 and 224 and the compressor 230 may operate at a given time, operation of both heating elements 222 and 224 at the same time may require special electrical considerations (e.g. a larger circuit breaker, a dedicated circuit, etc.) to accommodate an increased current draw. Therefore in the illustrative embodiments simultaneous energization of both heating elements is avoided.

Figure 3:
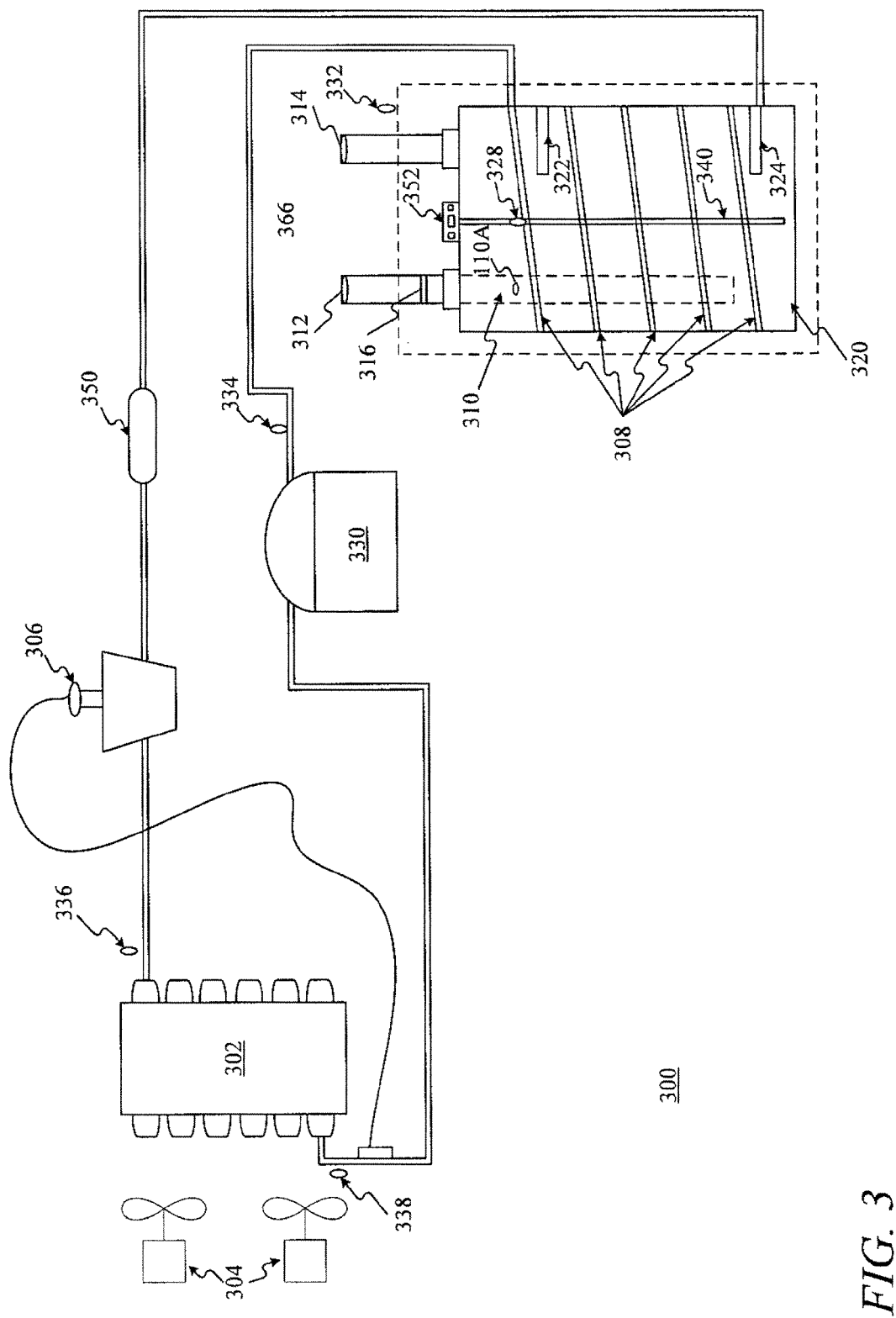
FIG. 3 depicts a third embodiment of a heat pump water heater schematic consistent with embodiments of the invention.

Referring now to FIG. 3, FIG. 3 depicts a heat pump water heater 300 schematic consistent with embodiments of the invention. The heat pump system comprises an evaporator 302, a compressor 330, a condenser 308, a throttling device 306, and at least one fan 304. During operation of the heat pump cycle a refrigerant exits the evaporator 302 as a superheated vapor and/or high quality vapor mixture. The heat pump water heater 300 may have sensors placed at various locations. In the embodiment of FIG. 3, a temperature sensor 328 is placed in tank 320 near upper heating element 322. The positioning of a temperature sensor 328 inside of the tank, connected to a rod 340 allows for the water temperature to be sensed directly, rather than by measuring tank wall temperature and inferring water temperature. Positioning the temperature sensor 328 inside of the water storage tank 320 improves the response time and accuracy of water temperatures sensed. Temperature sensor 334 is placed at the outlet of the compressor 330 to measure the compressor discharge temperature to protect against overheating the compressor. A temperature sensor 332 is provided to measure ambient temperature. Additionally, temperature sensors 336 and 338 measure the evaporator 302 inlet and exit temperatures respectively. This embodiment of the heat pump water heater 300 also has electric heating elements 322 and 324 placed near the top and bottom of the water storage tank 320 respectively.

The HPWH system 300 includes a controller 352 that is operatively configured to receive data representative of temperature readings measured by the temperature sensors 328, 332, 334, 336 and 338. Data from sensors 332, 336 and 338 are used by controller 352 in the same manner as was described with reference to their counterparts in the embodiment of FIG. 2. Controller 352 is configured to process the compressor discharge data and turn the compressor off if the sensed temperature exceeds a predetermined reference temperature selected to prevent overheating of the compressor. For example, in the illustrative embodiment, a reference temperature of 240° F. is used. The heat pump water heater 300 includes an inlet 312 for allowing cold water to enter the heat pump water heater 300, where it is directed to the bottom of the tank 320 via a dip tube 310. The heated water exits the heat pump water heater near top of tank 320 at exit 314 and flows to the residence or other place where heated water is desired. The heat pump water heater 300 also includes a flow meter 316 for measuring the amount and the flow rate of water into the water storage tank 320. The flow meter 316 measures the total amount of water that has flowed into the water storage tank 320 during a given time interval. For example, the flow meter 316 may determine that in a given month a homeowner may have used 1,000 gallons of heated water. Temperature sensors 328, 332, 334, 336 and 338 are configured to transmit data representative of the temperatures measured to the controller 352 for processing. The controller 352 processes this temperature data and flow rate data to automatically determine which of the compressor 330, the upper electric resistance heater 322, and the lower electric resistance heater 324 shall be energized in order to heat the water within the water storage tank 320.

Figure 4:
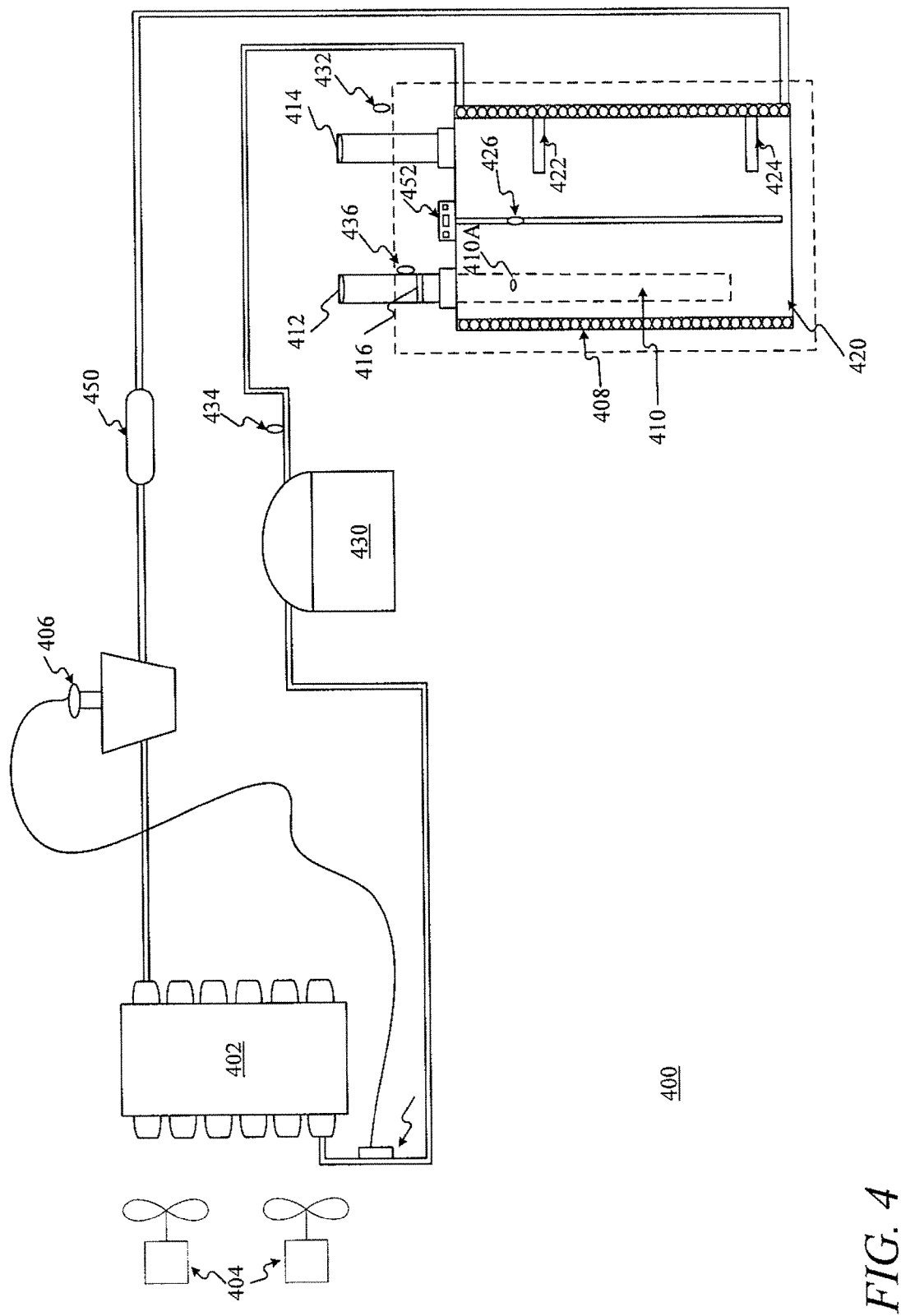
FIG. 4 depicts a fourth embodiment of a heat pump water heater schematic consistent with embodiments of the invention.

Referring now to FIG. 4, FIG. 4 depicts a heat pump water heater 400 schematic consistent with embodiments of the invention. The heat pump system is of a configuration similar to that illustrated in FIG. 3, except that the condenser 408 substantially covers the water tank 420 side walls, facilitating the ability to provide more heat to the water within the water storage tank through the condenser wrapped around the exterior of the water storage tank 420.

Figure 5A:
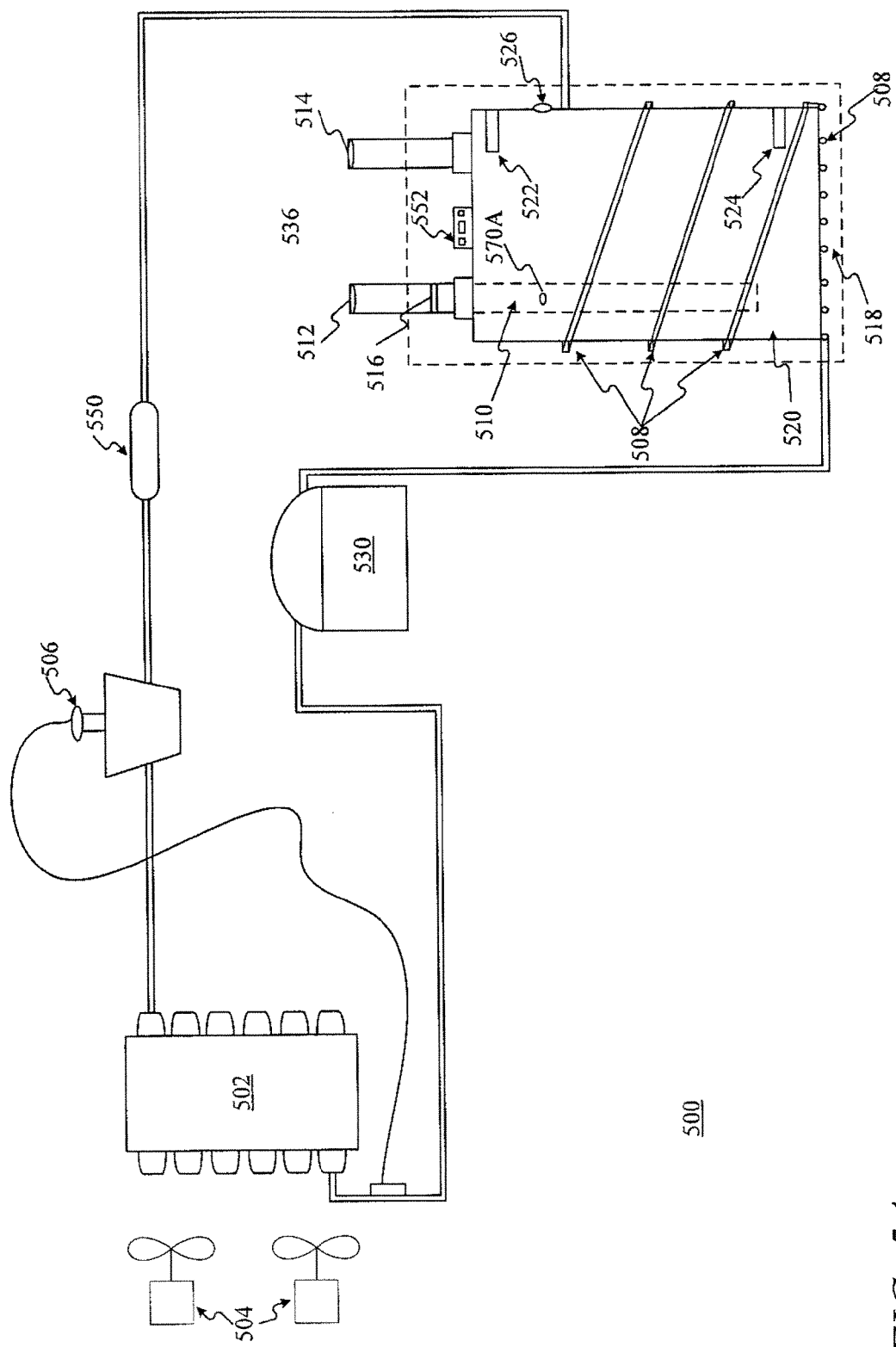
FIG. 5A depicts a fifth embodiment of a heat pump water heater schematic consistent with embodiments of the invention.
Figure 5B:
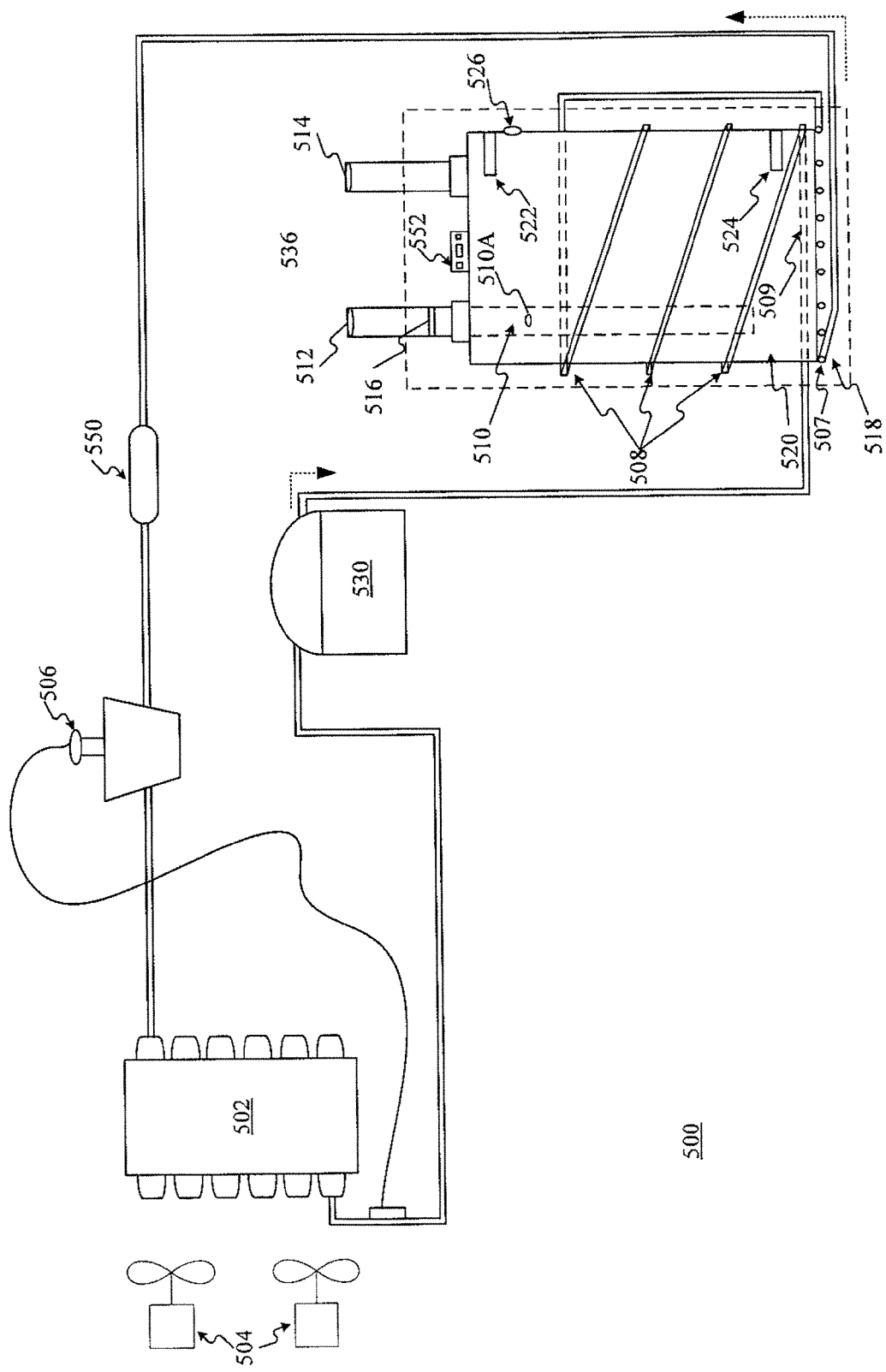
FIG. 5B depicts a sixth embodiment of a heat pump water heater schematic consistent with embodiments of the invention.

Referring now to FIGS. 5A and 5B, FIG. 5A depicts a heat pump water heater 500 schematic consistent with embodiments of the invention. The heat pump system is of a configuration similar to that illustrated in FIG. 1, except that the condenser 508, includes a cylindrical portion which at least partially covers the side wall of water tank 520, and a bottom portion which at least partially covers the bottom wall 518, facilitating the ability to provide more heat from the condenser to the coldest water within the water storage tank through the bottom portion of condenser 508. In the embodiment shown in FIG. 5A, the bottom portion of condenser 508 is in contact with the bottom wall 518 in a spiral coil configuration. It is contemplated that the bottom portion of condenser 508 that is in contact with the bottom wall 518 may be in alternative configurations so long as the alternative configuration allows for increased surface area contact with bottom wall 518. The heat pump system comprises an evaporator 502, a compressor 530, a condenser 508, a throttling device 506, at least one fan 504, and electric heating elements 522 and 524 placed near the top and bottom of the water storage tank 520 respectively. A thermistor 526 is placed in tank 520 near upper heating element 522.

The heat pump water heater 500 includes an inlet 512 for allowing cold water to enter the heat pump water heater 500, where it is directed to the bottom of the tank 520 via a dip tube 510. The heated water exits the heat pump water heater near top of tank 520 at exit 514 and flows to the residence or other place where heated water is desired. Temperature sensor 526 is configured to transmit data representative of the temperatures measured to the controller 552 for processing. The controller 552 processes data representative of the temperature of water within the water storage tank 520 in order to determine which of the compressor 530, the upper electric resistance heater 522, and the lower electric resistance heater 524 shall be energized in order to heat the water within the water storage tank 520.

FIGS. 5A and 5B also illustrate a heat pump water heater system 500 wherein the condenser 508 is operatively connected to compressor 530 in a manner that facilitates delivery of the super heated refrigerant vapor from the compressor 530 to the condenser 508 in a manner whereby the super heated refrigerant vapor at its hottest state is channeled initially through the inlet portion of the condenser 508 which is proximate the bottom of the water storage tank 520. Transitioning the super heated refrigerant vapor through the condenser 508 such that the refrigerant vapor transmits heat first to the lower portion of the water storage tank 520 allows for the super heated refrigerant vapor to transmit heat to water within the water storage tank 520 at its coldest point. The embodiments illustrated in FIGS. 1-4 transmit super heated refrigerant vapor from the compressor 503 to the condenser 508 in a top to bottom manner whereby the super heated refrigerant vapor at its hottest state engages the upper and middle portion of the water storage tank 520 first. In these embodiments the water at the lowest portion of the water storage tank is heated by super heated refrigerant vapor within the condenser 508 that has been cycled through the condenser 508 and had heat removed from the upper portion of the water storage tank 520. The embodiments illustrated in FIGS. 5A and 5B are configured to facilitate the transmission of heat from the super heated vapor traveling through the condenser 508 to the coldest water within the water storage tank 520 initially. More specifically, in the embodiment of FIG. 5A, the super heated refrigerant vapor initially enters and flows through the bottom portion of the condenser 508 and then enters the cylindrical portion of the condenser at the lowermost point of the cylindrical portion, and from there flows gradually upward through the cylindrical spiral around the side wall of the water tank and exits the condenser 508 near the top of the water storage tank 520. The result is a relatively low temperature gradient in the water storage tank 520 relative to that which is typical of the more conventional top to bottom condenser arrangements of the prior art. For example, in the configuration of illustrative embodiment of FIG. 5A, temperature gradients in the tank on the order of 1° F.-3° F. have been achieved, as compared to gradients on the order of 15° F.-30° F. for conventional heat pump water heater configurations and 10° F. from the lower element to the top of the tank for conventional electric water heaters. If measured from the area beneath the lower element to the top of the tank in electric water heaters, the gradient can be closer to 50° F.-60° F. This means that in the illustrative embodiment, the entire tank 520 of water has been heated to the set-point temperature, not just the water in the top portion of the water storage tank 520. This configuration is very effective in reducing the temperature gradient in the tank. However, it is vulnerable to a potential refrigerant migration problem under certain, relatively rare conditions. If the incoming water is particularly cold, e.g., 35° F.-40° F., and enough water is withdrawn rapidly so that at least half, but not substantially all, of the condenser coil is exposed to the incoming cold water, the refrigerant in the condenser will tend to migrate to the coldest portion of the condenser which is the portion extending beneath the bottom of the tank rather than circulating up through the portion of the condenser which circumscribes the tank side wall resulting in not enough refrigerant returning to the compressor for efficient operation of the sealed system. For example, in a 50 gallon storage tank, a withdrawal on the order of approximately 20 gallons of water could create such a condition. This vulnerability is avoided in the embodiment illustrated in FIG. 5B which includes a "Return Flow" condenser design component. In the design illustrated in FIG. 5B, the vapor flow first enters the cylindrical portion of condenser 508. The inlet to this portion of the condenser is located at the lower most point 509 of the cylindrical portion. The vapor flows up through the portion of the condenser coil 508 that wraps around the water tank and then flows down to and through the bottom portion 507 on the bottom of tank 518 exiting the condenser at the bottom of the tank. This arrangement still exposes the hot refrigerant vapor initially to the coldest portion of the tank proximate the bottom. However, by proceeding up the cylindrical portion before entering to the bottom portion, the coldest portion of the condenser is now near the exit of the condenser and the compressor is able to circulate the refrigerant through and out of the condenser thus avoiding the refrigerant migration problem.

Each of the embodiments of the heat pump water heater disclosed in FIGS. 1-5 has four modes of operation. An electric mode, a heat pump mode a hybrid mode and a high demand mode. The electric mode—operates using only electric resistance heaters. Heat pump mode—uses only the sealed system driven by the compressor to heat water. Hybrid Mode—uses the sealed system driven by the compressor as the primary energy source for heating the water, but also uses the upper electric element to enable a more rapid recovery from events creating a relatively low temperature condition in the tank, such as when filling an empty or substantially empty tank, or following the withdrawal of a relatively large amount of hot water in a relatively short time. Like the hybrid mode, the high demand mode selectively uses the sealed system and the upper electric element, but it also selectively uses the lower heating element to enable rapid recovery when particularly large amounts of water are being withdrawn at a high rate over an extended time.

The controller is operative in all four modes to respond to standby cooling, that is, the gradual lowering of the temperature of the water in the tank due to heat loss through the insulated tank walls over time when no heat is being applied and no hot water is being withdrawn, and to flow event cooling, that is, the lowering of the temperature resulting from the withdrawal of hot water from the top of the tank which is replaced by cold water entering the bottom portion of the tank through the dip tube. When hot water is withdrawn from the water storage tank 120, cold water is brought in by dip tube 110 to replace the water that has been removed. Dip tube 110 pushes the cold water brought in to the bottom of water storage tank 120. The cold water begins to mix with the hot water already in tank 120. However, when the cold water initially enters the tank 120, the upper sensor 126 continues to read the temperature of water in the upper region of the tank which is normally at or close to the set point level. Over time, due to mixing, the temperature measured by upper sensor 126 begins to drop. Because the system uses only a single water temperature sensor located near the top of the tank, the controller needs to be able to respond to small temperature changes sensed by this sensor if occasioned by a flow event, by turning on the lower heat source to heat the cold water that has entered the bottom portion of the tank. Responding to such small changes in temperature if caused by the standby cooling rather than flow event cooling would result in unnecessarily short cycling.

Because the controller 152 is continually receiving data representative of the temperature of water within the water storage tank 120 as measured by upper sensor 126, when the temperature of the water to drops the controller 152 is operative to generally distinguish between a drop in temperature due to standby cooling and a drop in temperature due to a flow event. The controller detects the first condition by detecting a temperature less than a threshold temperature which in the illustrative embodiments is a first predetermined offset from the set point temperature. The controller detects the second condition by detecting the occurrence of a flow event, either by input from the flow meter in those embodiments that employ such a device, or in embodiments not so equipped, by processing the water temperature data, as will be hereinafter described, and by detecting a temperature less than a threshold temperature which in the illustrative embodiment is a second predetermined offset from the set point temperature which is a smaller offset than the first offset so as to enable the controller to respond to a smaller temperature differential when a flow event is detected.

In the hybrid mode and in the electric mode, the controller is also operative to respond effectively to a condition in which the sensed temperature of the water in the tank is significantly lower than the set point temperature, such as might occur when initially filling the tank with cold water, or upon the withdrawal of an unusually large amount of hot water over a relatively short period of time. Such conditions are referred to herein as cold tank conditions.

For purposes of an illustrative example, assume that the water storage tank 120, shown in FIG. 1, is full of cold water and the mode of operation is hybrid. When HPWH 100 is powered on, the upper sensor 126 senses the temperature of the water within water storage tank 120 and transmits data representative of the water temperature to the controller 152. The controller 152 processes the data representative of the temperature of the water within the water storage tank 120 and determines that it is below a defined cold tank threshold selected to be representative of a water temperature low enough to require energization of the heat sources in a manner intended to rapidly heat the water at least at the top of the tank which would be withdrawn first, to a temperature at least near the set point temperature in a reasonable period of time. In this exemplary embodiment the cold tank threshold for the hybrid mode is set at 30° F. lower than the set point, e.g., T−30° F., where T is the set point temperature. In the illustrative embodiments, the set point is selectable by the user from a range on the order of 100° F.-140° F. A vacation mode set point of 50° F. is also available in the illustrative embodiments for a user anticipating a long period of non-use, for example. However, the set point temperature T could be selectable from a broader or narrower range, or predetermined factory set value or it could be a value selected automatically in accordance with temperature control algorithms implemented in the controller. Regardless of how selected, the set point temperature represents the desired or target temperature for the water stored in the tank. In hybrid mode, under these conditions, the controller 152 energizes the upper electric heating element 122 in order to heat the top portion of the water within water storage tank 120 until the water temperature reaches a second hybrid threshold temperature which is less than the set point temperature, but close enough to rely on the heat pump system to become the energy source to heat the water in the lower portion of the tank and to complete the recovery of the water temperature in the tank to the set point temperature within a reasonable time. The controller 152 is operative to continue to energize the upper heating element 122 until receiving data representative of temperatures at or above this second threshold temperature, at which time the controller 152 causes the upper electric heating element 122 to be de-energized. The second threshold is set below the set point temperature in order to compensate for any temperature overshoot, which may be caused as a result of the distance between the temperature sensor and the upper heating element 122, since the temperature of the water proximate the upper heating element 122 when the element is energized is higher than that proximate the sensor 126 located on the wall of the tank. During the delay period while the warmer water travels from the upper heating element 122 to the sensor 126, heat is still being added to the water by the electric heating element 122. Accordingly, this excess heat may cause the temperature of the water to exceed the set point temperature. In the illustrative embodiment this second hybrid threshold temperature is selected to be 3° F. less than the set point temperature, that is, T−3° F.

When the upper electric heating element 122 is de-energized, in response to the temperature in the upper portion of the tank exceeding the second hybrid threshold, the water in the lower portion of the water storage tank 120 continues to be cold, because, the water within the lower portion of the water storage tank 120 cannot be effectively heated with upper electric heating element 122. To address this condition, upon de-energizing upper electric heating element 122, the controller 152 energizes the compressor 130, driving hot refrigerant through the condenser 108 around water storage tank 120 to heat the water in the lower portion of the tank, and continues to do so until the sensor 126 reads and transmits data to the controller 152 representative of temperature greater than or equal to the set point, T. Upon the controller 152 receiving and processing data representative of a sensed water temperature greater than or equal to the set point temperature, T, the controller 152 transmits a signal to de-energize the compressor 130 and thereby discontinue transmission of heat to the water in water storage tank 120. In this hybrid mode example, following recovery from the cold tank condition, that is having brought the temperature sensed by the sensor to the set point temperature, and in the absence of a flow event, the heat pump will remain de-energized as long a the temperature in the tank remains above a third hybrid threshold temperature selected to be sufficiently close to the set point temperature to maintain an acceptable temperature in the tank without excessive cycling to recover from the slow heat loss through the tank walls over time, which in the illustrative embodiment is set at T−5° F. If the sensed water temperature drops below T−5° F., the sealed system is energized until the sensed temperature is restored to the set point temperature, T. By this arrangement, heat loss due to standby cooling is addressed.

As briefly mentioned above, a flow event is characterized by the withdrawal of hot water from the tank. More particularly, a flow event for temperature control purposes is characterized by the withdrawal of hot water in such a manner that the rate of change of temperature sensed in the tank exceeds a flow event detection threshold rate. If the sensed temperature drops below the set point temperature, the controller checks for a flow event. Upon detection of a flow event, the sensed temperature is compared to a flow event threshold temperature which is less than the set point temperature, and if the sensed temperature becomes less than this threshold temperature, the sealed system is energized to restore the temperature to the set point temperature. The flow event threshold temperature is selected to be sufficiently close to the set point to enable the system to promptly respond to the flow event so as to minimize the time required for the water temperature in the tank to be restored to the set point temperature. In the illustrative embodiment, the flow event threshold is set at one degree F. less than the set point temperature, that is, T−1° F.

In this example, operation in the electric mode is similar to the hybrid mode, the primary difference being that the lower electric heating element is energized instead of the sealed system when heat to the lower portion of the tank is needed. Another associated difference is that the cold tank threshold temperature for the electric mode is selected to be T−25° F., which is slightly higher than the hybrid cold tank threshold temperature. The same threshold temperature offset could be used in both modes, however, in keeping with the intent of the hybrid mode to provide improved energy efficiency by relying primarily on the use of the sealed system with only limited use of the electric element, use of the lower threshold temperature in that mode results in less use of the electric element without significantly compromising recovery time.

Considering again a cold tank example to demonstrate the electric mode, upon detection of a water temperature less than the electric mode cold tank threshold temperature of T−25° F., the controller 152 energizes the upper electric heating element 122 in order to heat the top portion of the water within water storage tank 120 until the water temperature reaches a second hybrid threshold temperature which is less than the user set point temperature, but close enough to rely on the lower electric heating element to become the energy source to heat the water in the lower portion of the tank and to complete the recovery of the water temperature in the tank to the set point temperature within a reasonable time. In the illustrative embodiment, this is T−3° F., just as in the hybrid mode. The controller 152 is operative to continue to energize the upper heating element until receiving data representative of temperatures at or above this second threshold temperature, at which time the controller 152 causes the upper electric heating element 122 to be de-energized. As in the hybrid mode, the water in the lower portion of the water storage tank 120 continues to be cold, so, the controller 152 energizes the lower heating element 124, driving heat into the water in the lower portion of the water storage tank 120 until the sensor 126 reads and transmits data representative of an overshoot threshold temperature which in the electric mode is greater than the set point temperature. Upon the controller 152 receiving and processing data representative of a temperature equal to or greater than the overshoot threshold temperature, the controller 152 transmits a signal to de-energize the lower heating element 124 and thereby discontinue transmission of heat to the water in lower portion of the water storage tank 120. In the electric mode, the overshoot threshold temperature is used rather than the set point temperature to account for the relative locations of the lower heating element and the temperature sensor. It has been empirically determined that when heating the water in the tank using the lower element, the heat tends to flow outwardly toward the tank side wall and then upward along the wall. Since the temperature sensor is located on an upper portion of the tank wall, it responds to the temperature of the water near the wall which heats up faster than the water in the center of the tank, so the threshold temperature is set at a temperature higher than the set point temperature to allow the water in the center of the tank to reach the set point temperature. In the illustrative example, the overshoot threshold temperature is set at T+5° F.

Continuing with the electric mode example, following recovery from the cold tank condition, that is having brought the temperature sensed by the sensor to the electric mode recovery threshold temperature of T+5° F., in the absence of a flow event, the lower heating element will remain de-energized as long as the temperature in the tank remains above a third hybrid threshold temperature selected to be sufficiently close to the set point temperature to maintain an acceptable temperature in the tank without excessive cycling due to heat loss through the tank walls, which in the illustrative embodiment is set at T−5° F. If the sensed water temperature drops below T−5° F., the lower heating element is energized until the sensed temperature is restored to the overshoot threshold temperature, T+5° F. As in the hybrid mode, upon detection of a flow event, the sensed temperature is compared to a flow event threshold temperature which is less than the set point temperature, and if the sensed temperature becomes less than this threshold temperature, the lower heating element is energized to restore the sensed temperature to the overshoot threshold temperature. The flow event threshold temperature is selected to be sufficiently close to the set point to enable the system to promptly respond to the flow event so as to minimize the time required to recover from the flow event. In the illustrative embodiment, the flow event threshold is set at 1° F. less than the consumer selected set point temperature, that is, T−1° F.

If the mode of operation is heat pump, the upper sensor 126 senses the temperature of the water within water storage tank 120 and transmits data representative of the water temperature to the controller 152. The controller 152 processes the data representative of the temperature of the water within the water storage tank 120 and determine that it is below the set point. The controller 152 energizes the compressor 130, driving hot refrigerant through the condenser 108 around water storage tank 120 until the sensor 126 reads and transmits data representative of the set point temperature having been reached or exceeded to the controller 152. Upon the controller 152 receiving and processing data representative of set point temperature having been reached or exceeded, the controller 152 transmits a signal to de-energize the compressor 130 and thereby discontinue transmission of heat to the water in water storage tank 120.

Each of the operative modes relies upon the detection of a flow event to control heat sources in response to routine withdrawal of hot water from the tank. In embodiments employing a flow meter, the actual flow rate of the water exiting, or entering the water heater is directly measured and if it exceeds a predetermined threshold rate, a flow event is signified and the controller responds accordingly. A threshold rate on the order of 2-3 gallons per minute should provide satisfactory results in a 50 gallon tank. In embodiments not equipped with a flow meter, use is made of water temperature data to indirectly detect the occurrence of a flow event.

Figure 6:
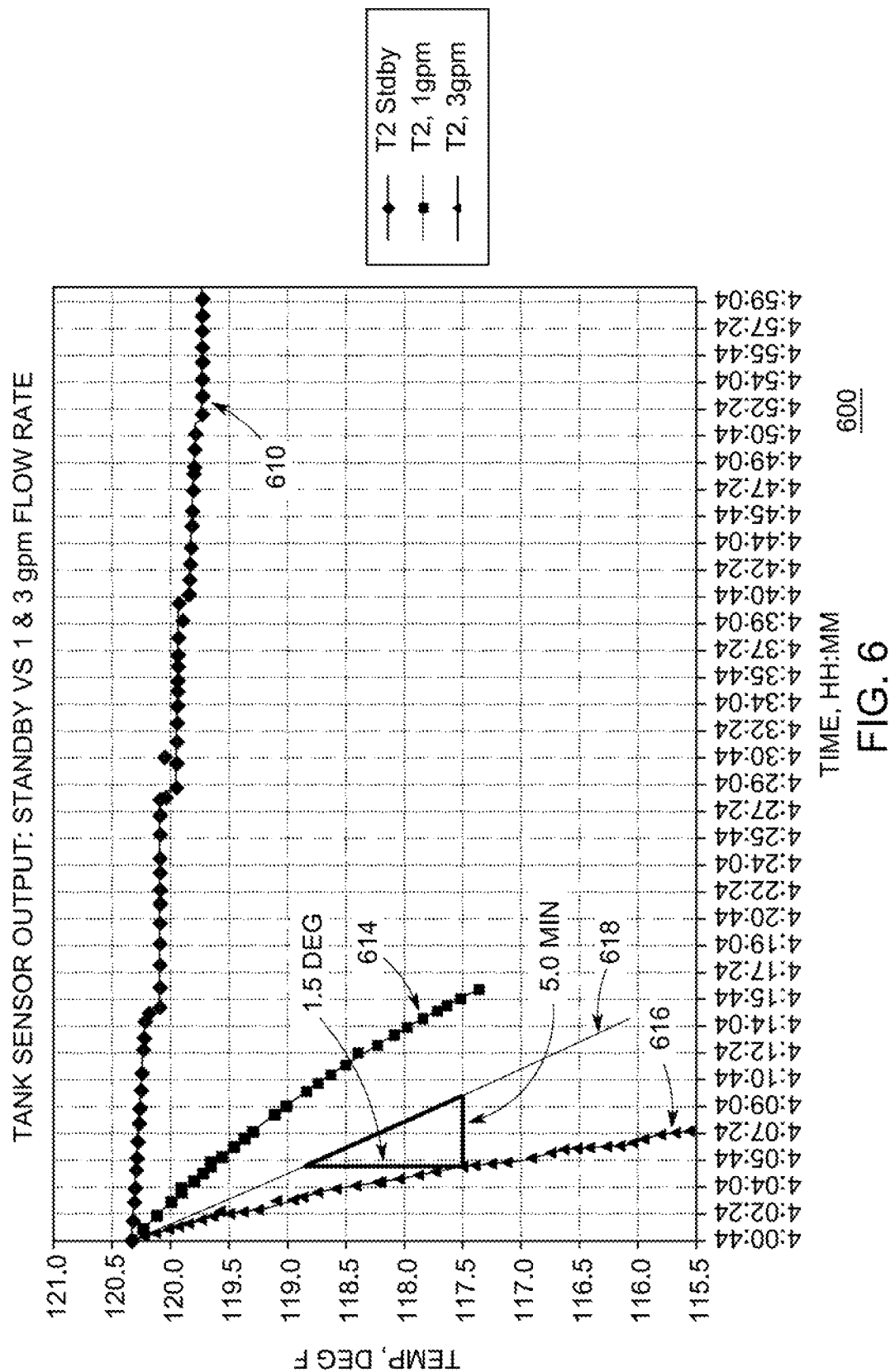
FIG. 6 is a graph illustrating a comparison of sensor output near the top of a storage tank when the unit is in standby mode and when there is a rate of one gallon per minute of water flowing from the water storage tank.

FIG. 6 illustrates an example of data representative of temperature readings as a function of time for a 50 gallon water heater in which the water has been heated to approximately 120° F. as measured by upper sensor 126. Line 610 illustrates temperature readings measured by an upper sensor 126 when upper heating element 122, lower heating element 124 and compressor 130 are de-energized and no water is being withdrawn. As line 610 illustrates the temperature of water being measured drops at a rate over time that is characteristic of standby heat loss that is heat loss through the insulation of the water storage tank side walls. Line 614 of the temperature readings 600 illustrates data representative of temperature readings measured by upper sensor 126 as hot water is being withdrawn from the tank at a rate of 1 gallon per minute, and line 616 represents the temperature data as hot water is being withdrawn from the tank at a rate of 3 gallons per minute.

In the illustrative embodiments utilizing this technique, a rate of 0.3° F. per minute has been selected as the threshold or reference rate for detecting a flow event. Line 618 in FIG. 6 represents this threshold flow event rate. If the controller 152 detects a drop in temperature sensed by sensor 126 at a rate greater than this flow event reference rate of 0.3° F./minute, then the controller 152 knows that flow event has occurred. In this example, receipt and processing of data representative readings illustrated by line 616 by the controller 152 allows the controller 152 to determine that the sensed rate of change is greater than the threshold or control limit rate of change signifying that a flow event occurred. The use of this threshold rate in the illustrative embodiment enables the controller to reliably respond to flow rates on the order of 3 gallons per minute or higher as flow events. It is to be understood however, that this threshold rate may be set at any level that facilitates detection of water being withdrawn from the water tank and is not limited to detection of a drop in temperature at a rate greater than illustrative threshold rate of 0.3° F./minute. In the illustrative embodiments, the controller looks for a drop of 0.3° F. over one minute moving windows checking every five seconds to detect a flow event. If a drop greater than 0.3° F. is detected within a one minute window the system recognizes a flow event and responds accordingly. In connection with this description of this technique for detecting flow events, it should be noted that dip tubes in commercially available water heaters include an anti-siphon aperture located near the upper end of the tube, which may have a diameter on the order of 0.120 inches. When cold water enters the tank via the dip tube, a small portion of the entering water bleeds through this anti-siphon aperture into the upper region of the tank. In addition, dip tubes in commercially available residential water heaters such as those commercially available under the GE brand have structure proximate the exit end of the dip tube to introduce turbulence into the entering water which produces a flow restriction. This flow restriction increases back pressure in the tube which increases the rate of bleeding through the ant-siphon aperture. As illustrated in FIGS. 1-5, in the illustrative embodiments, the anti-siphon aperture (110a in FIG. 1) is at roughly the same height in the tank as the water temperature sensor 126 (in FIG. 1). The bleeding of cold water into the tank through the anti-siphon aperture is important to the effectiveness of the upper temperature sensor in detecting a flow event. Satisfactory results were achieved in the illustrative embodiment with the commercially available dip tube anti-siphon aperture and outlet turbulence structure employed in electric residential water heaters commercially available under the GE brand. However, the sensitivity of detection may be adjusted by adjustments to the aperture size and/or the amount of flow restriction introduced at the exit of the dip tube for optimization for particular water storage tank configurations.

In prior art water heater systems that include an upper sensor toward the top of the water tank and a lower sensor toward the bottom of the water tank, the upper sensor detects changes in the temperature of the water in the upper portion of the water storage tank and causes an upper heating element to be turned on until the upper sensor senses that the temperature in the water in the top portion of the tank is heated to a defined set point temperature. The lower sensor in these systems detects changes in the temperature of the water in the lower part of the tank and causes the lower heating element to be turned on until the lower sensor senses that the temperature in the water recovers to the defined set point temperature. One of the problems with such a configuration is that sequential small flow events will cause the water in the top of the tank to overheat as a result of stacking. In such prior art systems, each time cold water is added to the bottom of a water storage tank, energy is added to the water because the lower heating element is turned on each time as a result of the detected temperature change. As a result, heat rises to the top of the water storage tank, causing the water in the top of the water storage tank which is already at the set temperature level to over heat when the additional energy is added. When a number of the small flow events occur sequentially, the additional energy added to the water in the top of the water in the water storage tank begins to stack up and causes overheating of the water. The use of a single sensor in the manner hereinbefore described solves that problem. While the exemplary embodiments of this aspect of the present invention are heat pump water heaters, that include an electric mode, it will be appreciated that this aspect of the invention is not limited to such embodiments and could be similarly employed for example in water heaters heated only by electric heating elements.

Figure 7A:
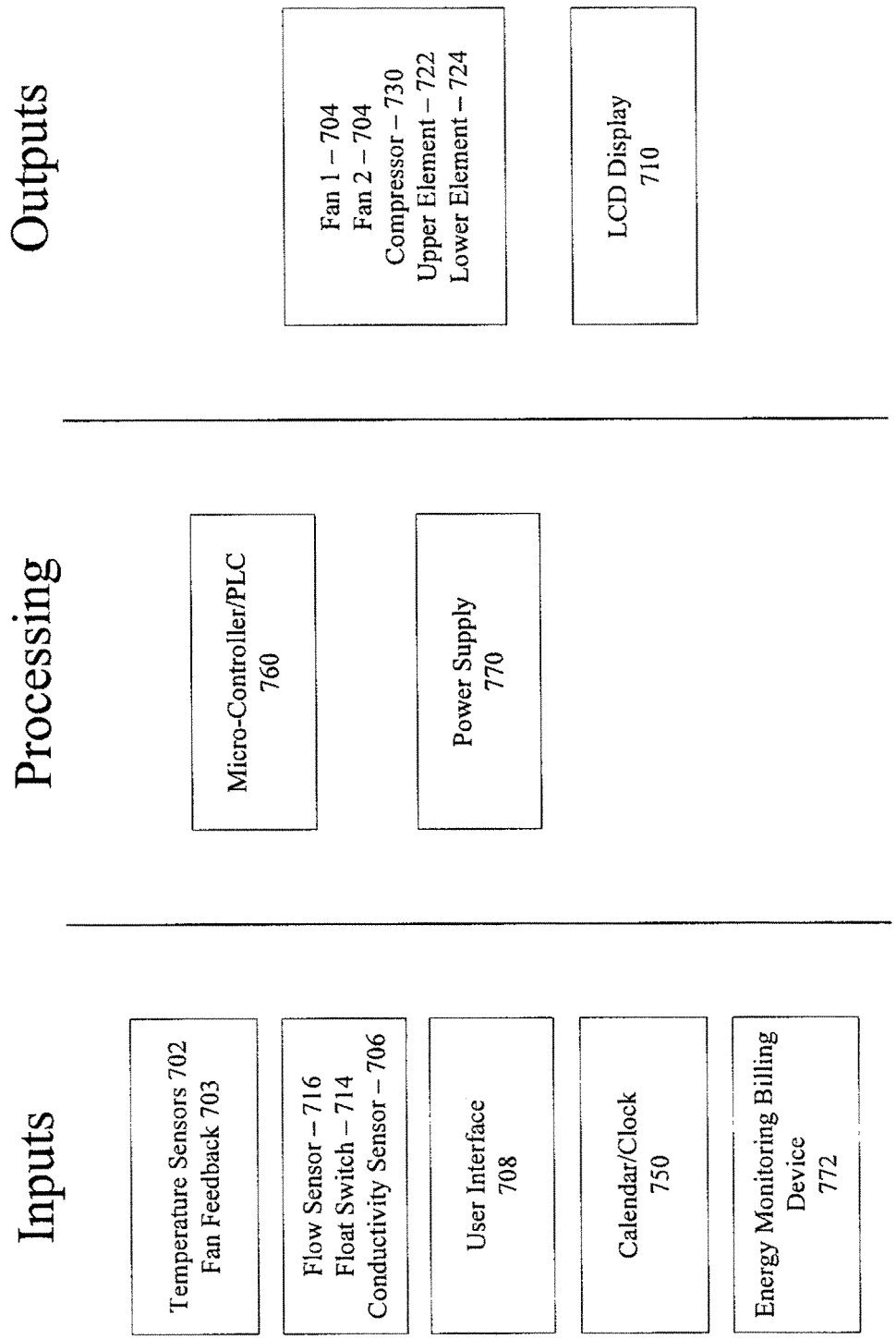
FIGS. 7A and 7B depict a control block diagram and a wiring diagram respectively, consistent with embodiments of the invention.

Referring now to FIG. 7A, FIG. 7A depicts a control block diagram consistent with embodiments of the invention. The control block diagram indicates some of the inputs, processing, and outputs that may be required during operation of the heat pump water heater. For example, the inputs may include inputs from one or more temperature sensors, depending on the particular embodiment, collectively represented here as the temperature sensors 702. In the illustrative embodiments, the temperature sensors are thermistors, however, other types of temperature sensors could be similarly employed. Other inputs may include feedback 703 from the fans 704 indicative of fan speed. Also, inputs may be received from a flow sensor 716, a float switch 714, and a conductivity sensor 706. Flow sensor 716 could be used to monitor hot water usage. Float switch 714 may be used to monitor the accumulation of condensation from the evaporator and to cause a pump or other device to be activated to remove the condensation or to provide a signal to the user that condensate needs to be removed. Conductivity sensor 706 may be used for monitoring condensate accumulation in lieu of a float switch, or may be used to detect water near the base of the water heater indicating a potential leak in the water storage tank. The inputs may further comprise inputs from a user interface 708, a clock and/or a calendar 750. In one embodiment, the clock is powered by non-volatile memory/battery/capacitor in order to maintain time-of-day clock such that if power is lost, a user does not have to re-set the date/time (as is required on many household appliances with clocks). This may also be accomplished by more elegant methods of reading the atomic clock satellite output, etc. Inputs may also be received from an energy monitoring billing device 772. Energy monitor billing devices comprise devices installed by a utility company used to limit the power draw during peak demand times. For example, during summer months it is common for power companies to provide consumers with rebates for the privilege of allowing the power company to shut down devices which draw large amounts of power such as water heaters, heat pumps, and air conditioning systems.

The processing may be done by a main PCB, which may be a microcontroller or PLC controller 760, etc. The main PCB may also regulate a power supply 770. For example, the main PCB 760 includes a water temperature and flow module that processes data representative of the temperatures measured by a plurality of thermistors. The outputs for the control system may include power supply to fans 704, power to the compressor 730, upper heating element 720, and lower heating element 118. The outputs may also include indicating information on user interface 708 (not shown). The indications may be in the form of an LCD display and or LED lights as indicated by reference numeral 710 respectively.

Figure 7B:
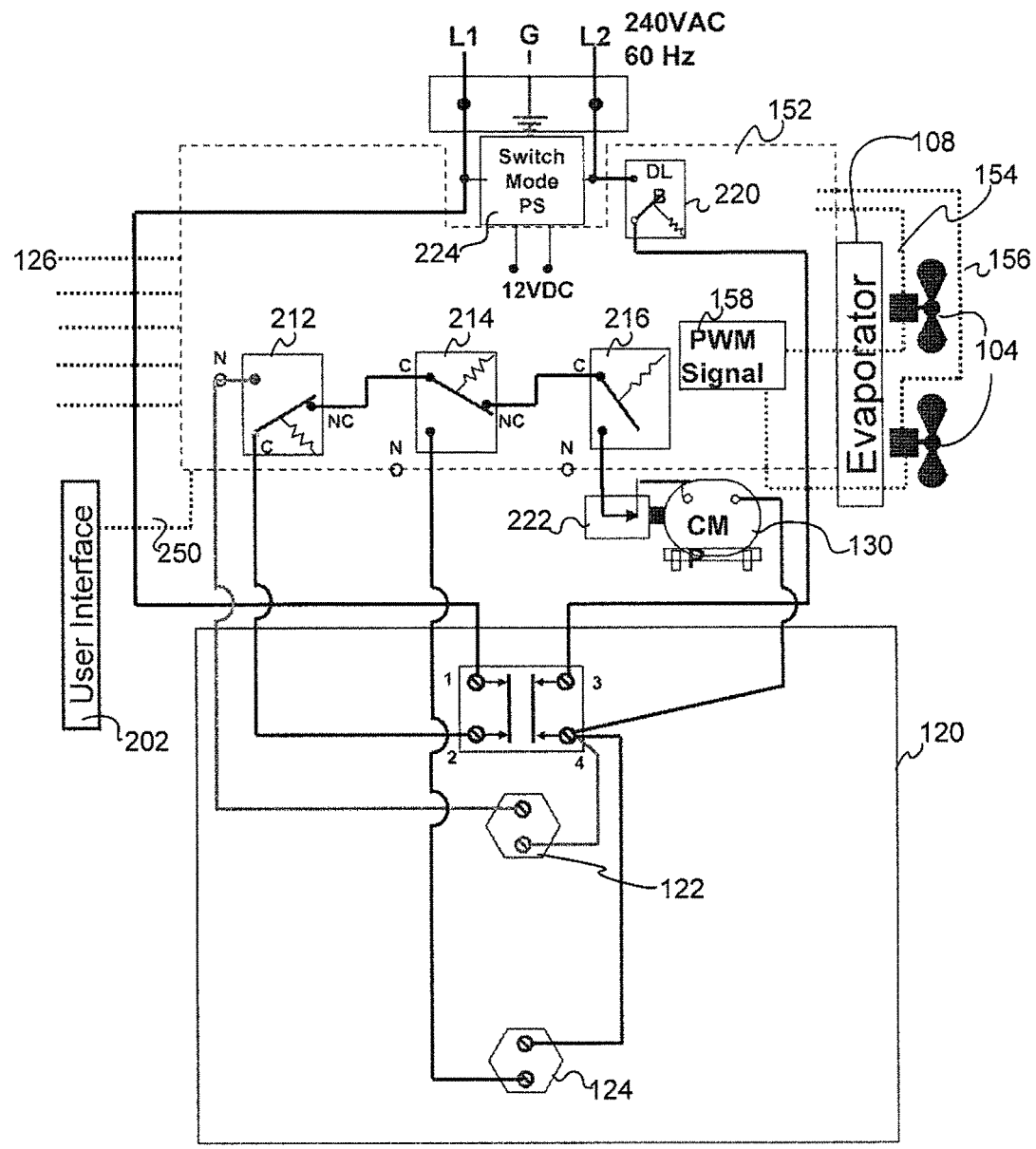

FIG. 7B is a representative wiring diagram for the illustrative embodiment of FIG. 1. The power input for the heat pump water heater 100 may be standard residential power. For example, the power supply may be a 240 volt alternating current (VAC) circuit operating at 60 Hz. This generally consists of three wires; two 120 VAC inputs and one ground, (i.e. no neutral wire). A Switch Mode Power Supply 224 is provided in the form of a conventional rectification circuit to provide a 12 volt dc power supply for the fans 104 and for the relay drivers and other electronic controller needs. System operation is controlled by a main controller 152. The main controller 152 receives inputs such as the input from sensor 126. In addition, the main controller 152 receives feedback inputs from and controls operation of the fans 104 as indicated by reference numerals 154 and 156. In the illustrative embodiment, fans 104 are variable speed dc fans. However, ac fans could be similarly employed. Operation of the fans 104 includes monitoring and controlling fan speed, and providing power to the fans 104 for operation by way of pulse width modulated pulses from signal generator 158. In one embodiment, fan speed is monitored via tachometer feedback built into the fan. The fans utilized in the present embodiment may be of a magnet/hall-effect sensor design. When a fan rotates, the magnet passes near the hall-effect sensor resulting in a pulse signal output. The frequency of the pulses generated is analyzed and used to calculate the rotational speed of the fan. Notwithstanding the specific method of monitoring fan speed in the above described embodiment, it is contemplated that fan speed may be monitored in plurality many different ways. The main controller 152 may also be configured to recognize a fan malfunction such as burnt out motors, excess winding temperatures, vibration, inadequate fan speed, etc. Using the above described tachometer feedback; the signal sent to the fan may be compared with the speed feedback. For example, if a 50% input is given, it would be expected that the tachometer feedback should indicate an approximate 50% of the max RPM. Also, if a signal is transmitted to the fan to facilitate operation at any speed, and there is no feedback indicating fan rotation, this can be interpreted as a fan failure.

The main controller 152 also includes a relay 212 for controlling the upper heating element 122, a relay 214 for controlling the lower heating element 124, and a relay 216 for controlling the compressor 130 relays 212-216 are cascaded such that only one of the heat sources is energized at any one time. The cascaded relays are coupled to power supply line L1 through contacts 1 and 2 of thermal cutout switch 218. Similarly, the power circuit is coupled to power supply line L2 through contacts 3 and 4 of switch 218. Switch 218 is a convention thermal cut out switch which is mounted to the wall of tank 120 to be responsive to the temperature of the tank wall. If the tank wall overheats to a temperature in excess of the cut out threshold temperature, which in the illustrative embodiment is 170° F., the switch element coupling contact 1 to contact 2 opens breaking the connection to L1 and the switch element coupling contacts 3 and 4 opens breaking the connection to L2, thereby limiting the temperature of the tank. Relay 220 couples contact 3 of cut out switch 218 to L2, to provide a double break between the AC power supply and the power control circuitry when the system is in the off state. Controller 152 switches relay 220 to couple L2 to contact 4 of switch 218, when the system is on and relay 220 is in its normally open state otherwise. Referring again to the cascaded arrangement of relays 212-216, terminal c of relay 212 is/connected to contact 2 of switch 218. Its normally open contact is connected to upper heating element 122, and its normally closed contact is connected to terminal c of relay 214. The normally open contact of relay 214 is connected to lower heating element 124 and its normally closed contact is connected to terminal c of relay 216. The normally open contact of relay 216 is connected to compressor 130 through discharge pressure cutoff switch 222. Cutoff switch 222 is a conventional pressure switch employed in a conventional manner to protect the sealed system from excessive pressure. By this arrangement, to energize upper element 122, controller 152 switches relay 212 to its normally open state thereby connecting heating element 122 across L1 and L2. When relay 212 is in this state, L1 can only be connected to heating element 122. To energize lower heating element 124, controller 152 switches relay 212 to its normally closed state and relay 214 to its normally open state. This connects heating element 124 across L1 and L2. When relay 212 is in its normally closed state and relay 214 is in its normally open state L1 can only be connected to lower element 124. To energize compressor 130, controller 152 switches relays 212 and 214 to their normally closed states and switches relay 216 to its normally open state. This connects pressure switch 222 and compressor 130 in series across L1 and L2. The main controller 152 also accepts inputs from a user interface 202 as indicated by reference numeral 230. The main controller 152 also may include an integral timer that is configured as part of the heat pump water heater electronic control, providing a user with the ability to control and program the heating activity of the heat pump water heater, such that energy may be conserved when there is no need for water to be heated.

In the circuit configuration for the embodiment illustrated in FIG. 7B, during operation of the heat pump water heater 100 only one of heat sources, that is, heating elements 122 and 124 and compressor 130 may operate at any given time. This limits the electrical load. However, it is contemplated that in alternative configurations, that one of heating elements 122 or 124 and the compressor 130 may operate simultaneously. Furthermore, it is contemplated that in alternative configurations both heating elements 122 and 124 and the compressor 130 may operate simultaneously. However, operation of both heating elements 122 and 124 at the same time may require special electrical considerations (e.g. a larger circuit breaker, a dedicated circuit, etc.) to accommodate an increased current draw. Notwithstanding, it is contemplated that operation of both heating elements 122 and 124 may occur at the same time. Similar circuitry with additional sensor and other inputs can be employed for the embodiments of FIGS. 2-5.

FIG. 8 is an illustration of the process flow within the water temperature and flow module within the controller during operation of the HPWH. As illustrated, following the system being energized 792; a determination is made as to whether the water storage tank is full 794. The method of determining whether the water storage tank is full is performed by the controller initiating a plurality of steps. First, the condenser, which is in contact with the exterior of the water storage tank is initiated for a defined period of time and heats the exterior walls of the water storage tank. If the tank is empty, the water storage tank will begin to warm up at a rate faster than when there is water in the tank. The controller facilitates monitoring of the temperature of the exterior walls by way of a sensor positioned in sufficient proximity to the water storage tank wall. In the illustrative embodiments sensor 126 is used for this purpose, however, a separate temperature sensor could be similarly employed. If the tank is full or at least has water at an acceptable level then the rise in temperature will not exceed a defined limit. If the temperature measured by the sensor rises above this limit it is an indication that the water storage tank is empty or the water level within the tank is below a desired level. If the water storage tank is not full, the water temperature and flow module within the controller facilitates the initiation of a display illustrating that the tank is dry or not full 796. The system suspends further operation until the tank is filled sufficiently to satisfy the tank full test. Upon the water storage tank being filled with water, the query as to whether the water storage tank is full 794 will result in an affirmative answer. Next, the system determines an appropriate mode of operation. The illustrative embodiments have four modes of operation, a standard electric mode, a heat pump mode, a hybrid mode and a high demand mode comprised of a combination of the use of electrical elements and the heat pump. The system allows for the use of the mode of operation previously in use 798 or an operator may select a mode of operation 802. During operation, the water temperature and flow module must first verify the mode of operation selected by an operator. As part of the verification process, the controller first queries whether the mode of operation is the standard electric mode at 804. If the mode of operation is not standard electric mode, the controller next queries whether the mode of operation is the heat pump mode at 806. If the mode of operation is not heat pump mode, the controller next queries whether the mode of operation is the high demand mode at 807. If not the high demand mode, by default the water temperature and flow module switches the system into the hybrid mode at 808.

Figure 8A:
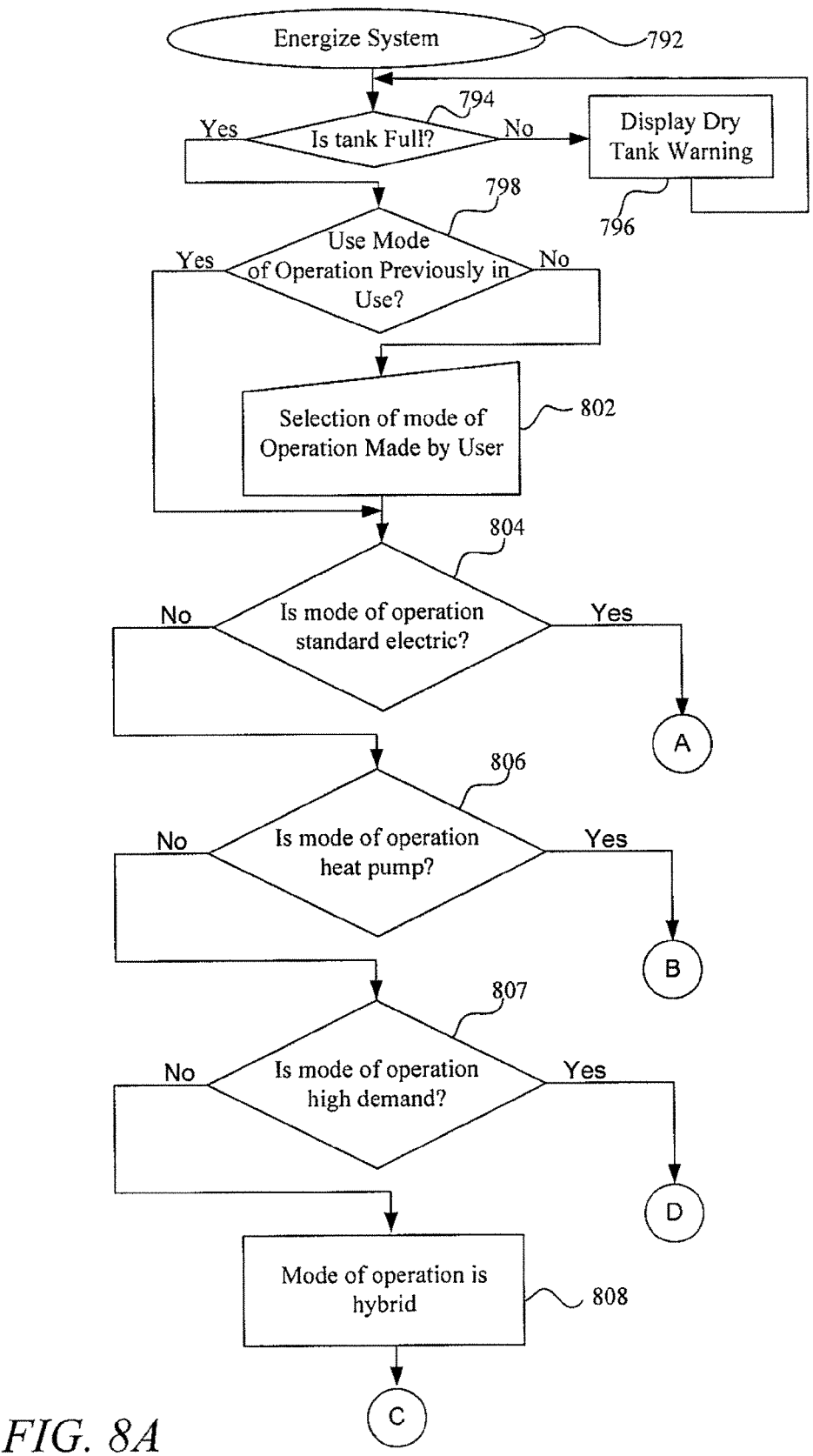
FIGS. 8A-8E illustrates a process flow of the temperature and flow module's automatic control of the heat pump condenser and electric heating elements.
Figure 8B:
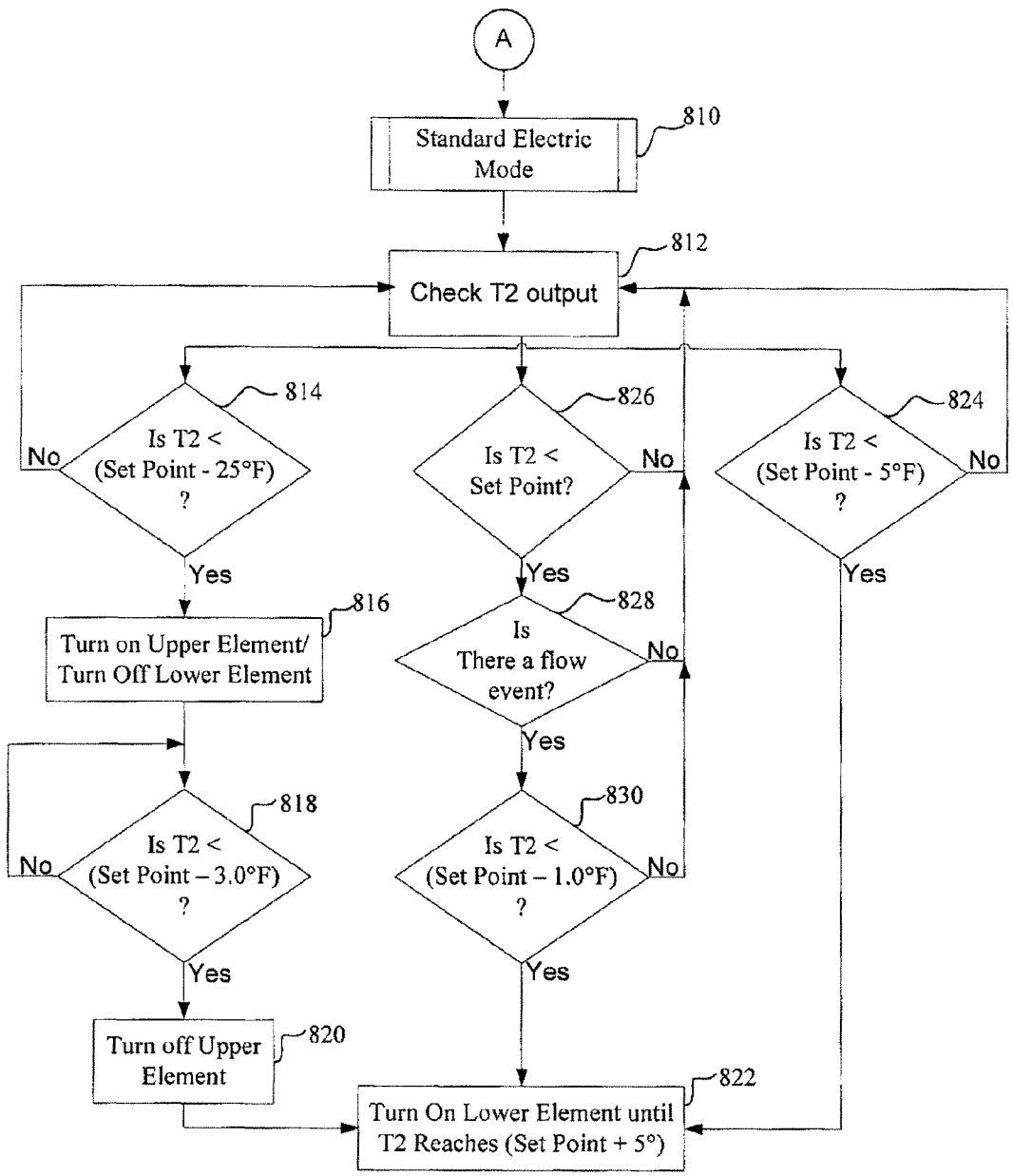

When the selected mode of operation is standard electric mode, the controller implements the standard electric mode 810 (FIG. 8B). In this mode the temperature and water flow module obtains water temperature data T2 from sensor 126 (812). The temperature and water flow module is configured to check first for a Cold tank condition signified by a value of T2 indicating a water temperature which is less than the electric mode cold tank threshold temperature T−25° F. (814) where T is the set point. If T2 is less than T−25° F., then the upper heating element 122 is energized and the lower element is de-energized in the event it happens to be already energized when a cold tank condition is detected (816). Since, the module is configured to give priority to the cold tank condition, and in the illustrative embodiments, both electric elements are not to be energized at the same time, if the lower element is already energized to satisfy another condition when a cold tank condition is detected, it is necessary to de-energize the lower element 124. Heating element 122 will continue to be energized until T2 rises to within 3° F. of the set point (818). When T2 exceeds T−3° F., the upper element 122 is de-energized (820) and the lower element 124 is energized (822). This operating condition will continue until T2 exceeds the overshoot threshold of 5° F. above the set point, that is, T2 is greater than T+5° F. or unless interrupted by detection of another cold tank condition at which time the lower heating element is den-ergized and the module continues to monitor T2 (810).

Returning again to 814, if T2 is not less than T−25° F., the temperature and water flow module checks next to determine heat is required due to standby cooling, by determining if the sensed water temperature is less than T−5° F. (824). If yes, then the lower heating element 124 is energized and remains energized until the overshoot threshold temperature of T+5° F. is reached (822) or a cold tank condition is detected (814).

Returning to 824, if the sensed temperature is not less than T−5° F., the temperature and water flow module checks next to determine if heat is needed due to a flow event by first comparing the sensed temperature T2 to the set point temperature T (826). If T2 is not less than T, no energization of heat sources is needed and the system continues to monitor T2 (812). If T2 is less than T, the module next looks for the occurrence of a flow event (828). As hereinbefore described, this is determined in some embodiments from the output of a flow meter and in others from temperature rate of change data. If no flow event is detected, the module continues to monitor T2 (812). If a flow event is detected the module determines if T2 is less than the set point minus 1 degree F. (830). If not, the module continues to monitor T2 (810). If T2 is less than T−1° F., then the lower element is energized and remains energized until T2 equals or exceeds the overshoot threshold T+5° F. (822) unless interrupted by detection of a cold tank condition (814).

Figure 8C:
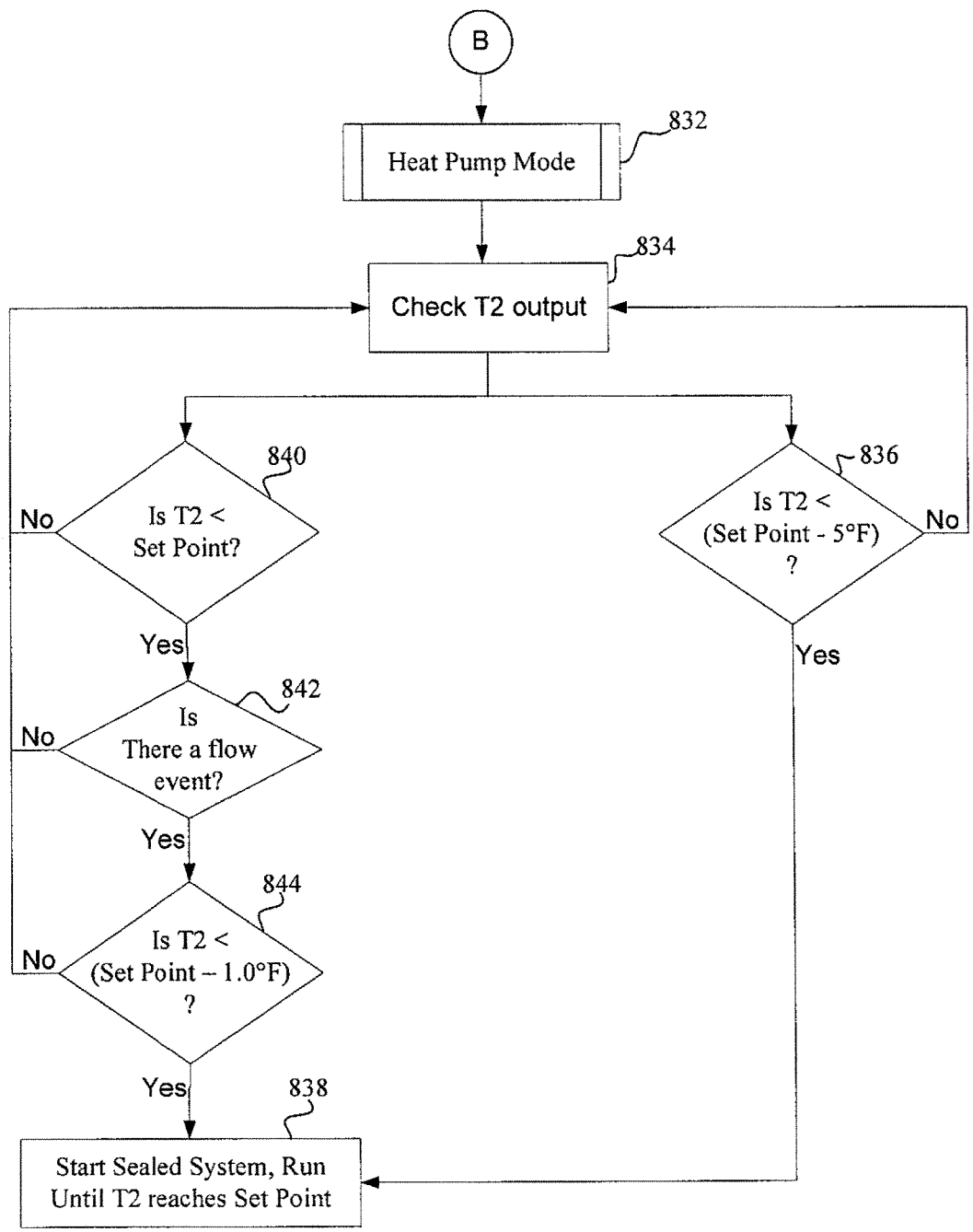

When the selected mode of operation is the heat pump mode, the module implements the heat pump mode (832) (FIG. 8C). In the heat pump mode, only the compressor driven sealed system is used to heat the water. The module is not configured to detect and respond to a cold tank condition in this mode, so the module monitors T2 (834) checking first to determine if; heat is required due to standby cooling, by determining if the sensed water temperature is less than T−5° F. (836). If yes, then the sealed system is energized and remains energized until the user selected set point temperature is reached (838).

Returning to 836, if the sensed temperature is not less than T−5° F., the temperature and water flow module checks next to determine if heat is needed due to a flow event by first comparing the sensed temperature T2 to the set point temperature T (840). If T2 is not less than T, no energization of heat sources is needed and the system continues to monitor T2 (834). If T2 is less than T, the module next looks for the occurrence of a flow event (842). If no flow event is detected, the module continues to monitor T2 (834) If a flow event is detected the module determines if T2 is less than the set point minus 1 degree F. (844). If not, the module continues to monitor T2 (834). If T2 is less than T−1° F., then the sealed system is energized and remains energized until T2 equals or exceeds the user selected set point temperature (838).

Figure 8D:
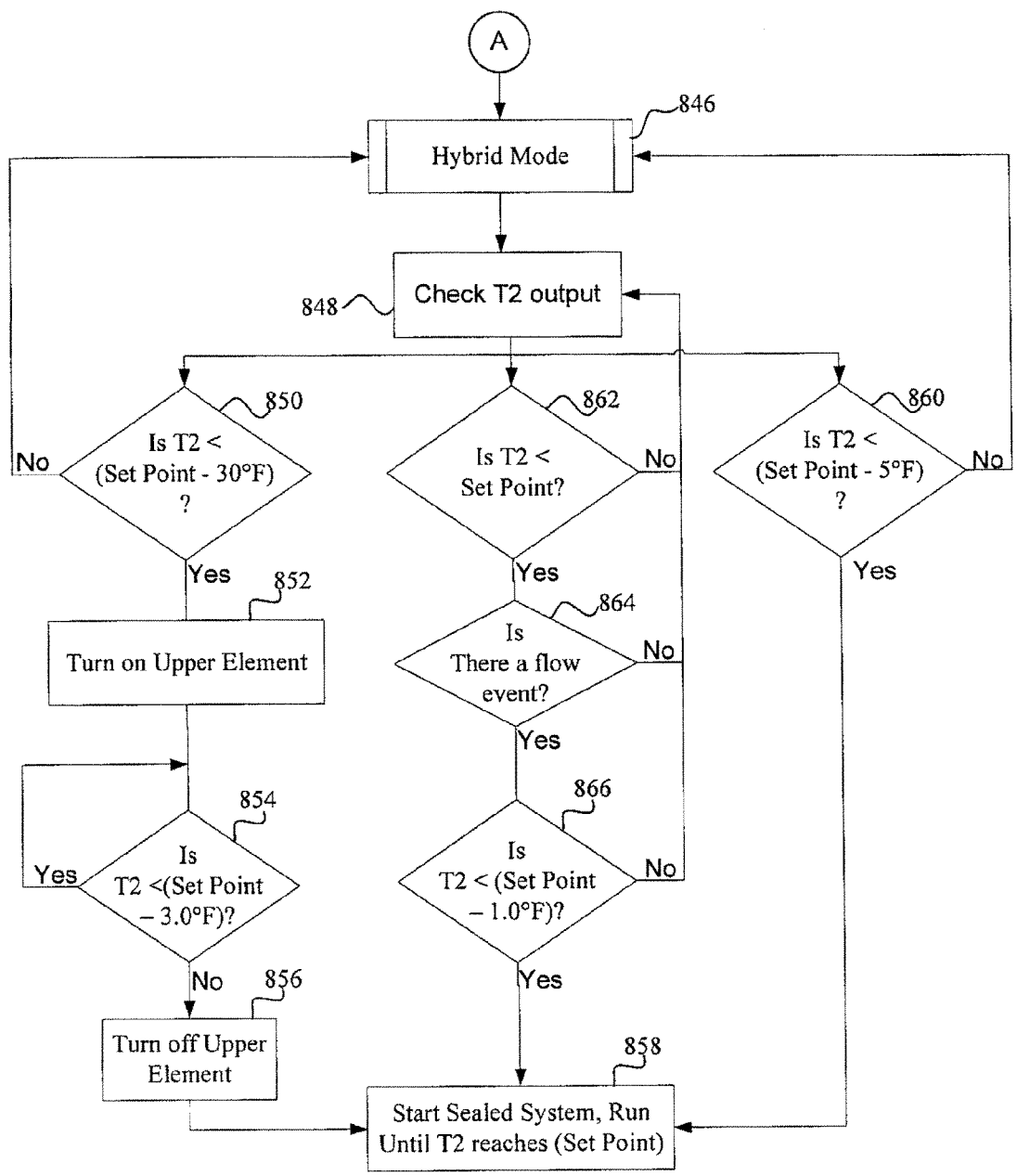

When the selected mode of operation is the hybrid mode, the module implements the hybrid mode (846) (FIG. 8D). In this mode the temperature and water flow module obtains water temperature data T2 from sensor 126 (848). As in the standard electric mode, the temperature and water flow module is configured to check first for a cold tank condition signified by a value of T2 indicating a water temperature which is less than a cold tank threshold temperature (850). However, in the illustrative embodiment, as hereinbefore described, the hybrid cold tank threshold temperature is T−30° F., which is less than the electric cold tank threshold temperature. If T2 is less than T−30° F., then the upper heating element 122 is energized. Heating element 122 will continue to be energized until T2 rises to within 3° F. of the set point (854). When T2 exceeds T−3° F., the upper element 122 is de-energized (856) and the operation of the sealed system is initiated (858). The sealed system will continue to run until T2 equals or exceeds the set point temperature, (unless interrupted by detection of another cold tank condition) at which time the sealed system is denergized and the module continues to monitor T2 (848).

Returning again to 850, if T2 is not less than T−30° F., the temperature and water flow module checks, next to determine if heat is required due to standby cooling, by determining if the sensed water temperature is less than T−5° F. (860). If yes, then the operation of the sealed system is initiated and the sealed system continues to run until the set point temperature, T, is reached or exceeded (858) (unless interrupted by detection of another cold tank condition) at which time the sealed system is denergized and the module continues to monitor T2 (848).

Returning to 860, if the sensed temperature is not less than T−5° F., the temperature and water flow module checks next to determine if heat is needed due to a flow event by first comparing the sensed temperature T2 to the set point temperature T (862). If T2 is not less than T, no energization of heat sources is needed and the system continues to monitor T2 (848). If T2 is less than T, the module next looks for the occurrence of a flow event (864). If no flow event is detected, the module continues to monitor T2 (848). If a flow event is detected the module determines if T2 is less than the set point minus 1 degree F. (866). If not, the module continues to monitor T2 (848). If T2 is less than T−1° F., then the operation of the sealed system is initiated and continues to run until T2 equals or exceeds the set point temperature T (858) (unless interrupted by detection of another cold tank condition) at which time the sealed system is denergized and the module continues to monitor T2 (848).

The high demand mode is a variation of the hybrid mode provided to respond to higher than typical hot water usage conditions, such as can occur in homes with high flow shower heads, e.g., flow rates on the order of 5 gallons per minute as compared to more typical shower heads with flow rates of 2 gallons per minute. In the high demand mode the system uses the heat pump to recover standby losses and small draws as in the hybrid mode. However, if a large flow event is detected, for example a water temperature drop of 3° F. in ten minutes, then the system uses the lower electric element to recover. In addition in a manner similar to hybrid mode, but with a higher threshold, the upper heating element is used to recover the water temperature in the top part of the tank and then the lower element is used to recover the water temperature in the lower part of the tank. As previously described herein, the system is configured to detect "flow events" by detecting a rate of change of temperature on the order of 0.3° F. over a period of one minute, using a one minute moving window, checked every five seconds. To detect a "large flow event" the system looks for a change in temperature of 3° F. over a period of ten minutes using a ten minute moving window also checked every five seconds, however, every thirty seconds may be sufficient.

Figure 8E:
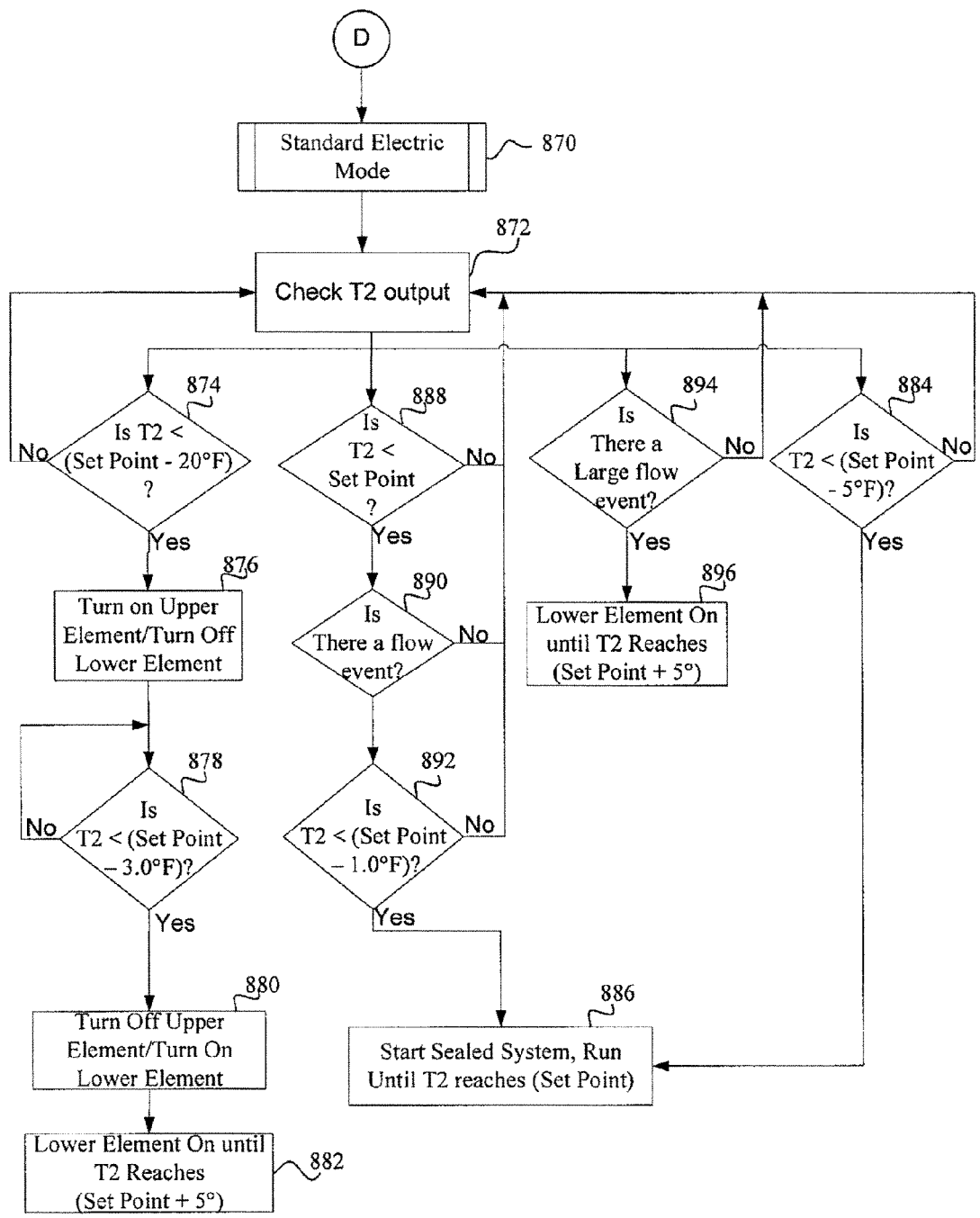

When the selected mode of operation is the high demand mode, the module implements the high demand mode (870) (FIG. 8E). In this mode the temperature and water flow module obtains water temperature data T2 from sensor 126 (872). As in the hybrid and standard electric modes, the temperature and water flow module is configured to check first for a cold tank condition signified by a value of T2 indicating a water temperature which is less than a cold tank threshold temperature (874). However, in the illustrative embodiment, as hereinbefore described, the hybrid cold tank threshold temperature is T−20° F., which is greater than the electric or hybrid cold tank threshold temperatures. This is to enable a quicker response to a cold tank condition, since high demand mode is intended for situations where cold tank conditions are likely to be more frequent. If T2 is less than T−20° F., then the upper heating element 122 is energized and the lower element is de-energized in the event it happens to be energized when the cold tank condition is detected (876). Heating element 122 will continue to be energized until T2 rises to within 3° F. of the set point (878). When T2 exceeds T−3° F., the upper element 122 is de-energized and the lower element is energized (880). As in the electric mode, this operating condition will continue until T2 exceeds the overshoot threshold of 5° F. above the set point, that is, T2 is greater than T+5° F. or unless interrupted by detection of another cold tank condition, at which time the lower heating element 124 is de-energized and the module continues to monitor T2 (872)

Returning again to 874, if T2 is not less than T−20° F., the temperature and water flow module checks next to determine if heat is required due to standby cooling, by determining if the sensed water temperature is less than T−5° F. (884). If yes, then the operation of the sealed system is initiated and the sealed system continues to run until the set point temperature, T, is reached or exceeded (886) (unless interrupted by detection of another cold tank condition or a large flow event) at which time the sealed system is de-energized and the module continues to monitor T2 (872).

Returning to 884, if the sensed temperature is not less than T−5° F., the temperature and water flow module checks next to determine if heat is needed due to a flow event by first comparing the sensed temperature T2 to the set point temperature T (888). If T2 is not less than T, no energization of heat sources is needed and the system continues to monitor T2 (848). If T2 is less than T, the module next looks for the occurrence of a flow event (890). If no flow event is detected, the module continues to monitor T2 (872). If a flow event is detected the module determines if T2 is less than the set point minus 1 degree F. (892). If not, the module continues to monitor T2 (848). If T2 is less than T−1° F., then the operation of the sealed system is initiated and continues to run until T2 equals or exceeds the set point temperature T (858) (unless interrupted by detection of another cold tank condition or large flow event) at which time the sealed system is de-energized and the module continues to monitor T2 (848).

Returning to 872, if at any time during operation in the high demand mode, unless the system is in the process of responding to a cold tank condition, detection of a large flow event (894) takes priority. If a large flow event is detected, that is if the controller detects a drop in water tank temperature sensed by sensor 126, of 3° F. or more in a running ten minute window, the lower heating element is energized (896) and remains energized until T2 exceeds the overshoot threshold of 5° F. above the set point, that is, T2 is greater than T+5° F. or unless interrupted by detection of another cold tank condition, at which time the lower heating element 124 is de-energized and the module continues to monitor T2 (872).

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat pump water heater comprising:
   a water storage tank comprising a sidewall and a bottom wall; and
   a condenser comprising a side portion that is wrapped around the sidewall, the condenser being positioned in a heat exchange relationship with the water storage tank to heat contents of the water storage tank and having an inlet and an outlet,
   wherein the inlet of the condenser is positioned proximate the bottom wall of the water storage tank so that refrigerant flow through the condenser can be initiated through the side portion of the condenser that is proximate the bottom wall of the water storage tank.

2. The heat pump water heater of claim 1, wherein the condenser further comprises a bottom portion arranged proximate to and in a heat exchange relationship with the bottom wall of the water storage tank so that refrigerant flow through the bottom portion of the condenser can occur following refrigerant flow through the side portion of the condenser.

3. The heat pump water heater of claim 1, wherein the condenser further comprises a bottom portion arranged proximate to and in a heat exchange relationship with the bottom wall of the water storage tank so that refrigerant flow through the bottom portion of the condenser can occur prior to refrigerant flow through the side portion of the condenser.

4. A heat pump water heater comprising:
   a water storage tank comprising a sidewall and a bottom wall;
   at least two heat sources, one of the at least two heat sources comprising a heat pump comprising a condenser having an inlet and an outlet, the condenser comprising a first portion that is wrapped around and in a heat exchange relationship with the sidewall to heat contents of the water storage tank, the inlet of the condenser being positioned proximate the bottom wall so that refrigerant flow through the condenser can be initiated through the first portion of the condenser that is proximate the bottom wall;
   a water temperature sensor; and
   a controller operatively connected to the water temperature sensor and to the at least two heat sources.

5. The heat pump water heater of claim 4, wherein another of the at least two heat sources is an electric resistance heater.

6. The heat pump water heater of claim 4, wherein the condenser further comprises a second portion arranged proximate to and in a heat exchange relationship with the bottom wall so that refrigerant flow through the second portion of the condenser can occur following refrigerant flow through the first portion of the condenser.

7. The heat pump water heater of claim 4, wherein the condenser further comprises a second portion arranged proximate to and in a heat exchange relationship with the bottom wall so that refrigerant flow through the second portion of the condenser can occur prior to refrigerant flow through the first portion of the condenser.

8. The heat pump water heater of claim 4, wherein the at least two heat sources further comprise:
   a first electric resistance heater positioned proximate an upper region of the water storage tank; and
   a second electric resistance heater positioned proximate a lower region of the water storage tank.

9. The heat pump water heater of claim 4, wherein the controller is configured to automatically select and energize the at least two heat sources independently or concurrently in response to a water temperature measured by the water temperature sensor.

10. A heat pump water heater comprising:
    a water storage tank comprising a sidewall and a bottom wall; and
    a condenser comprising a side portion that is wrapped around and in a heat exchange relationship with the sidewall to heat contents of the water storage tank, the condenser having an inlet and an outlet,
    wherein the inlet of the condenser is positioned proximate the bottom wall so that refrigerant flow through the condenser can be initiated through the side portion of the condenser that is proximate the bottom wall, and
    wherein the condenser further comprises a bottom portion arranged proximate to and in a heat exchange relationship with the bottom wall so that refrigerant flow through the bottom portion of the condenser can occur following refrigerant flow through the side portion of the condenser.

11. A heat pump water heater comprising:
    a water storage tank comprising a sidewall and a bottom wall; and a condenser comprising a side portion that is wrapped around and positioned in a heat exchange relationship with the sidewall to heat contents of the water storage tank, the condenser having an inlet and an outlet, wherein the inlet of the condenser is positioned proximate the bottom wall so that refrigerant flow through the condenser can be initiated through the side portion of the condenser that is proximate the bottom wall, and wherein the condenser further comprises a bottom portion arranged proximate to and in a heat exchange relationship with the bottom wall so that refrigerant flow through the bottom portion of the condenser can occur prior to refrigerant flow through the side portion of the condenser.

* * * * *